(12) United States Patent
Wu et al.

(10) Patent No.: US 11,019,524 B2
(45) Date of Patent: May 25, 2021

(54) METHOD AND DEVICE FOR UTILIZATION OF RADIO RESOURCES IN WIRELESS COMMUNICATION IN UE AND BASE STATION

(71) Applicant: SHANGHAI LANGBO COMMUNICATION TECHNOLOGY COMPANY LIMITED, Shanghai (CN)

(72) Inventors: Keying Wu, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/372,425

(22) Filed: Apr. 2, 2019

(65) Prior Publication Data

US 2019/0306743 A1 Oct. 3, 2019

(30) Foreign Application Priority Data

Apr. 2, 2018 (CN) .......................... 201810285136.X

(51) Int. Cl.
*H04W 28/02* (2009.01)
*H04W 28/20* (2009.01)

(52) U.S. Cl.
CPC ... *H04W 28/0257* (2013.01); *H04W 28/0263* (2013.01); *H04W 28/0289* (2013.01); *H04W 28/20* (2013.01)

(58) Field of Classification Search
CPC ......... H04W 28/0257; H04W 28/0263; H04W 28/0289; H04W 28/20
See application file for complete search history.

(56) References Cited

U.S. PATENT DOCUMENTS

| | | | |
|---|---|---|---|
| 2018/0175986 A1* | 6/2018 | Chendamarai Kannan | .................. H04L 5/005 |
| 2019/0222356 A1* | 7/2019 | Zhang | ................... H04L 1/0003 |

(Continued)

OTHER PUBLICATIONS

Samsung, "Resource Allocation for Autonomous Uplink Access," R1-1713522, 3GPP TSG RAN WG1 Meeting #90, Prague, P.R. Czechia, Aug. 25, 2017, pp. 1-4. (Year: 2017).*

(Continued)

*Primary Examiner* — Donald L Mills
(74) *Attorney, Agent, or Firm* — Maschoff Brennan

(57) ABSTRACT

The disclosure provides a method and a device in a User Equipment (UE) and a base station for wireless communication. The UE receives first information, listens in a first frequency subband, and transmits a first radio signal in the first frequency subband starting from a first time-position. The first time-position is in a first time window, and the act of listening is used for determining the first time-position; the first time-position is one of L candidate time-position(s) in the first time window; the first information and a time domain position of the first time window are used together for determining at least one of the L and the L candidate time-position(s) in the first time window; and the L is a positive integer. The disclosure improves the utilization of radio resources in Autonomous UpLink (AUL) transmission, avoids interferences between UEs, and guarantees the fairness of channel occupancy between different UEs.

20 Claims, 24 Drawing Sheets

(56) References Cited

U.S. PATENT DOCUMENTS

| | | | |
|---|---|---|---|
| 2019/0229970 A1* | 7/2019 | Bhattad | H04L 5/00 |
| 2019/0246391 A1* | 8/2019 | Zhang | H04L 1/1812 |
| 2019/0261210 A1* | 8/2019 | Tian | H04W 16/14 |
| 2019/0261379 A1* | 8/2019 | Yerramalli | H04L 61/2069 |
| 2019/0268912 A1* | 8/2019 | Myung | H04L 5/0055 |
| 2019/0297620 A1* | 9/2019 | Tian | H04W 72/0446 |
| 2020/0077438 A1* | 3/2020 | Kim | H04W 16/14 |

OTHER PUBLICATIONS

Intel, "A Framework to Enable Autonomous Uplink Access," R1-1712478, 3GPP TSG RAN WG1 Meeting #90, Prague, P.R. Czechia, Aug. 25, 2017, pp. 1-4. (Year: 2017).*

Nokia, "On Channel Access for Autonomous UL Access," R1-1713861, 3GPP TSG RAN WG1 Meeting #90, Prague, P.R. Czechia, Aug. 25, 2017, pp. 1-5. (Year: 2017).*

Nokia et al., "On Channel Access for Autonomous UL Access," R1-1713861, 3GPP TSG RAN WG1 Meeting #90, Prague, P.R. Czechia, Aug. 25, 2017, pp. 1-5. (Year: 2017).*

Huawei et al., "Resource Allocation for Autonomous UL Access on Unlicensed SCell," R1-1712112, 3GPP TSG RAN WG1 Meeting #90, Prague, P.R. Czechia, Aug. 25, 2017, pp. 1-3. (Year: 2017).*

* cited by examiner

| First Information | First bit string | ... |

FIG.6

| First sub-information | Second sub-information | Third sub-information | Fourth sub-information | Fifth sub-information | Sixth sub-information | Seventh sub-information | ... |

First uplink information

FIG.13

| First signaling | First field | Second field | Third field | Fourth field | Fifth field | ... |
|---|---|---|---|---|---|---|

FIG.19

| Second signaling | Sixth field | Seventh field | Eighth field | Ninth field | Tenth field | ... |
|---|---|---|---|---|---|---|

FIG.20

METHOD AND DEVICE FOR UTILIZATION OF RADIO RESOURCES IN WIRELESS COMMUNICATION IN UE AND BASE STATION

CROSS REFERENCE TO RELATED APPLICATION

This application claims the priority benefit of Chinese Patent Application Serial Number 201810285136.X, filed on Apr. 2, 2018, the full disclosure of which is incorporated herein by reference.

BACKGROUND

Technical Field

The disclosure relates to methods and devices in wireless communication systems, and in particular to a method and a device in a wireless communication system supporting data transmission on unlicensed spectrum.

Related Art

In conventional 3rd Generation Partner Project (3GPP) Long Term Evolution (LTE) systems, data transmission can occur on licensed spectrum only. However, with the increasing diversification of application scenarios and the sharp increase of services, the conventional licensed spectrum probably is difficult to meet the requirements of the services. In LTE Release 13 and Release 14, communication on unlicensed spectrum is introduced to cellular systems and it is applied to transmissions of uplink data and downlink data.

In LTE Licensed Assisted Access (LAA) items, a transmitter (base station or User Equipment (UE)) needs to perform Listen Before Talk (LBT) before transmitting data on the unlicensed spectrum, so as to avoid causing interferences to other wireless transmissions that are ongoing on the unlicensed spectrum. In order to avoid latency and reduction of resource utilization due to frequent LBT, Autonomous Uplink (AUL) access is introduced to the unlicensed spectrum in Release 15. In the AUL, a UE can conduct uplink transmission autonomously in air interface resources pre-configured by the base station.

SUMMARY

The inventor finds through researches that a plurality of UEs may share the same AUL resource in order to improve resource utilization. In order to avoid interferences between a plurality of UEs, the base station may allocate different transmitting start times for different UEs. However, a UE that occupies a channel in advance would prevent the subsequent UEs occupying the channel. Under this mechanism, how to guarantee the fairness of channel occupancy between different UEs is a problem to be resolved.

In view of the above problems, the disclosure provides a solution. It should be noted that the embodiments of the UE of the disclosure and the characteristics in the embodiments may be applied to the base station, and vice versa. The embodiments of the disclosure and the characteristics in the embodiments may be mutually combined if no conflict is incurred.

The disclosure provides a method in a UE for wireless communication, wherein the method includes:
receiving first information; and
listening in a first frequency subband, and transmitting a first radio signal in the first frequency subband starting from a first time-position.

Herein, the first time-position is in a first time window, and the act of listening is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one embodiment, the problem to be resolved in the disclosure is as follows: in the condition that a plurality of UEs share the same AUL resource, how to avoid interferences between UEs and meanwhile guarantee the fairness of channel occupancy between different UEs. The above method resolves the problem by enabling the L candidate time-position(s) to change with the time domain position of the first time window.

In one embodiment, the above method is characterized in that: the transmitting start time of the first radio signal changes with the variation of the time domain position of the first time window. This method enables different UEs to have different transmitting start times on one same AUL resource, and avoids the condition that a particular UE always occupies a channel prior to other UEs.

In one embodiment, the above method has the following benefits: on one same AUL resource different transmitting start times may be allocated to different UEs to avoid interferences between UEs and meanwhile the start time of one UE is allowed to change with time, thus avoiding the unfairness of channel occupancy between UEs caused by a particular UE always occupying a channel prior to other UEs.

According to one aspect of the disclosure, the act of listening is used for determining the first time-position from the L candidate time-positions.

In one embodiment, the above method has the following benefits: the UE can determine the first time-position from the L candidate time-positions autonomously according to the result of the act of listening, thus increasing the opportunity of accessing channel, improving the utilization of radio resources and reducing latency.

According to one aspect of the disclosure, the first radio signal carries first uplink information, and the first uplink information is used for determining the first time-position.

In one embodiment, the above method has the following benefits: a target receiver of the first radio signal can acquire from the uplink information the accurate information of the first time-position, thus reducing the probability of reception failure due to a misjudgment of the first time-position.

According to one aspect of the disclosure, the first information is used for determining M time windows, and the first time window is one of the M time windows; and the M is a positive integer greater than 1.

According to one aspect of the disclosure, a position of the first time window in the M time windows is used for determining at least one of the L and the L candidate time-position(s) in the first time window.

In one embodiment, the above method avoids the unfairness that a certain UE occupies a channel in advance in all of the M time windows relative to other UEs.

According to one aspect of the disclosure, the method comprises:

selecting the first time window from the M time windows autonomously.

According to one aspect of the disclosure, the method comprises:

receiving a first signaling.

Herein, the first signaling indicates frequency resources occupied by the first radio signal.

According to one aspect of the disclosure, the listening includes:

performing Q times of energy detections in Q time subpools on the first frequency subband respectively to obtain Q detection values.

Herein, the Q time subpools have an end time not later than the first time-position; Q1 detection value(s) among the Q detection values is(are) each less than a first threshold, the Q is a positive integer, and the Q1 is a positive integer not greater than the Q.

According to one aspect of the disclosure, the method comprises:

receiving a second signaling.

Herein, the second signaling indicates whether the first radio signal is correctly received.

The disclosure provides a method in a base station for wireless communication, wherein the method includes:

transmitting first information; and monitoring a first radio signal in a first frequency subband, and receiving the first radio signal in the first frequency subband starting from a first time-position.

Herein, the first time-position is in a first time window, and the act of monitoring is used for determining the first time window; the first time-position is one of L candidate time-position(s) in the first time window; the first information and a time domain position of the first time window are used together for determining at least one of the L and the L candidate time-position(s) in the first time window; and the L is a positive integer.

According to one aspect of the disclosure, the act of monitoring is used for determining the first time-position from the L candidate time-positions.

According to one aspect of the disclosure, the first radio signal carries first uplink information, and the first uplink information is used for determining the first time-position.

According to one aspect of the disclosure, the first information is used for determining M time windows, and the first time window is one of the M time windows; and the M is a positive integer greater than 1.

According to one aspect of the disclosure, a position of the first time window in the M time windows is used for determining at least one of the L and the L candidate time-position(s) in the first time window.

According to one aspect of the disclosure, the act of monitoring is used for determining the first time window from the M time windows.

According to one aspect of the disclosure, the method includes:

transmitting a first signaling.

Herein, the first signaling indicates frequency resources occupied by the first radio signal.

According to one aspect of the disclosure, the method includes:

transmitting a second signaling.

Herein, the second signaling indicates whether the first radio signal is correctly received.

The disclosure provides a UE for wireless communication, wherein the UE includes:

a first receiver, to receive first information; and a first processor, to listen in a first frequency subband, and to transmit a first radio signal in the first frequency subband starting from a first time-position.

Herein, the first time-position is in a first time window, and the act of listening is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one embodiment, the above UE for wireless communication is characterized in that the act of listening is used for determining the first time-position from the L candidate time-positions.

In one embodiment, the above UE for wireless communication is characterized in that the first radio signal carries first uplink information, and the first uplink information is used for determining the first time-position.

In one embodiment, the above UE for wireless communication is characterized in that the first information is used for determining M time windows, and the first time window is one of the M time windows; and the M is a positive integer greater than 1.

In one embodiment, the above UE for wireless communication is characterized in that a position of the first time window in the M time windows is used for determining at least one of the L and the L candidate time-position(s) in the first time window.

In one embodiment, the above UE for wireless communication is characterized in that the first processor further selects the first time window from the M time windows autonomously.

In one embodiment, the above UE for wireless communication is characterized in that the first receiver further receives a first signaling, wherein the first signaling indicates frequency resources occupied by the first radio signal.

In one embodiment, the above UE for wireless communication is characterized in that the listening includes: performing Q times of energy detections in Q time subpools on the first frequency subband respectively to obtain Q detection values, wherein the Q time subpools have an end time not later than the first time-position; Q1 detection value(s) among the Q detection values is(are) each less than a first threshold, the Q is a positive integer, and the Q1 is a positive integer not greater than the Q.

In one embodiment, the above UE for wireless communication is characterized in that the first receiver further receives a second signaling, wherein the second signaling indicates whether the first radio signal is correctly received.

The disclosure provides a base station for wireless communication, wherein the base station includes:

a first transmitter, to transmit first information; and a second processor, to monitor a first radio signal in a first frequency subband, and to receive the first radio signal in the first frequency subband starting from a first time-position.

Herein, the first time-position is in a first time window, and the act of monitoring is used for determining the first time window; the first time-position is one of L candidate time-position(s) in the first time window; the first information and a time domain position of the first time window are used together for determining at least one of the L and the L candidate time-position(s) in the first time window; and the L is a positive integer.

In one embodiment, the above base station for wireless communication is characterized in that the act of monitoring is used for determining the first time-position from the L candidate time-positions.

In one embodiment, the above base station for wireless communication is characterized in that the first radio signal carries first uplink information, and the first uplink information is used for determining the first time-position.

In one embodiment, the above base station for wireless communication is characterized in that the first information is used for determining M time windows, and the first time window is one of the M time windows; and the M is a positive integer greater than 1.

In one embodiment, the above base station for wireless communication is characterized in that a position of the first time window in the M time windows is used for determining at least one of the L and the L candidate time-position(s) in the first time window.

In one embodiment, the above base station for wireless communication is characterized in that the act of monitoring is used for determining the first time window from the M time windows.

In one embodiment, the above base station for wireless communication is characterized in that the first transmitter further transmits a first signaling, wherein the first signaling indicates frequency resources occupied by the first radio signal.

In one embodiment, the above base station for wireless communication is characterized in that the first transmitter further transmits a second signaling, wherein the second signaling indicates whether the first radio signal is correctly received.

In one embodiment, compared with conventional schemes, the disclosure has the following benefits.

In AUL access, different UEs can share the same AUL resource, thus the utilization of radio resources is improved. Different UEs are allocated with different transmitting start times on one same AUL resource, thus interferences between UEs are avoided. The condition that a particular UE always occupies a channel prior to other UEs is avoided, and the fairness of channel occupancy between different UEs is guaranteed.

The UE can determine the uplink transmitting time from multiple candidate time-positions autonomously according to the result of LBT, thus increasing the opportunity of accessing channel, improving the utilization of radio resources and reducing latency.

BRIEF DESCRIPTION OF THE DRAWINGS

Other features, purposes and advantages of the disclosure will become more apparent from the detailed description of non-restrictive embodiments taken in conjunction with the following drawings.

FIG. 6 is a diagram illustrating first information according to one embodiment of the disclosure.

FIG. 13 is a diagram illustrating first uplink information according to one embodiment of the disclosure.

FIG. 19 is a diagram illustrating a first signaling according to one embodiment of the disclosure.

FIG. 20 is a diagram illustrating a second signaling according to one embodiment of the disclosure.

DESCRIPTION OF THE EMBODIMENTS

Embodiment 1

Figure 1:
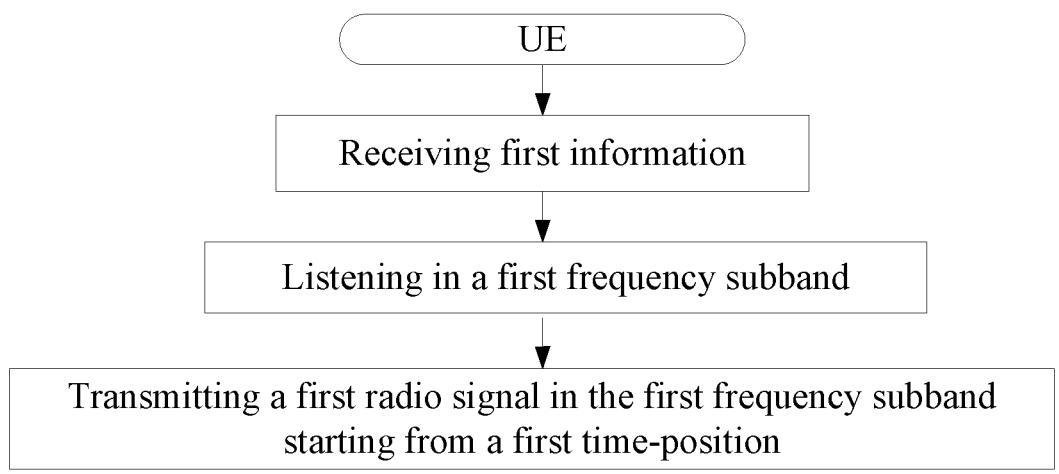
FIG. 1 is a flowchart of first information and a first radio signal according to one embodiment of the disclosure.

Embodiment 1 illustrates an example of a flowchart of first information and a first radio signal, as shown in FIG. 1.

In embodiment 1, the UE in the disclosure receives first information, listens in a first frequency subband, and transmits a first radio signal in the first frequency subband starting from a first time-position. Herein, the first time-position is in a first time window, and the act of listening is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one embodiment, the first information is carried by a high-layer signaling.

In one embodiment, the first information is carried by a Radio Resource Control (RRC) signaling.

In one embodiment, the first frequency subband is deployed in unlicensed spectrum.

In one embodiment, the first frequency subband includes one carrier.

In one embodiment, the first frequency subband includes a plurality of carriers.

In one embodiment, the first frequency subband includes one Bandwidth Part (BWP) in one carrier.

In one embodiment, the first frequency subband includes a plurality of BWPs in one carrier.

In one embodiment, the first frequency subband includes a positive integer number of consecutive subcarriers in frequency domain.

In one embodiment, the first information is transmitted on the first frequency subband.

In one embodiment, the first information is transmitted on a frequency band other than the first frequency subband.

In one embodiment, the first information is transmitted on a frequency band deployed in unlicensed spectrum.

In one embodiment, the first information is transmitted on a frequency band deployed in licensed spectrum.

In one embodiment, the act of listening is Listen Before Talk (LBT).

In one subembodiment, specific definitions and implementations of the LBT can refer to 3GPP TR36.889.

In one embodiment, the act of listening is Category 4 LBT.

In one subembodiment, specific definitions and implementations of the Category 4 LBT can refer to 3GPP TR36.889.

In one embodiment, the act of listening is Category 2 LBT.

In one subembodiment, specific definitions and implementations of the Category 2 LBT can refer to 3GPP TR36.889.

In one embodiment, the act of listening is a Clear Channel Assessment (CCA).

In one subembodiment, specific definitions and implementations of the CCA can refer to 3GPP TR36.889.

In one embodiment, the act of listening is a channel access procedure for uplink transmission.

In one subembodiment, specific definitions and implementations of the channel access procedure for uplink transmission can refer to Chapter 15.2 in 3GPP TS36.213.

In one embodiment, the act of listening is a Type 1 UL channel access procedure.

In one subembodiment, specific definitions and implementations of the Type 1 UL channel access procedure can refer to Chapter 15.2 in 3GPP TS36.213.

In one embodiment, the act of listening is a Type 2 UL channel access procedure.

In one subembodiment, specific definitions and implementations of the Type 2 UL channel access procedure can refer to Chapter 15.2 in 3GPP TS36.213.

In one embodiment, the act of listening is implemented through the method defined in Chapter in 3GPP TS36.213.

In one embodiment, the act of listening is energy detection, that is, the UE senses energies of radio signals in the first frequency subband, and averages the energies over time to obtain a received energy.

In one embodiment, the act of listening is energy detection, that is, the UE senses powers of radio signals in the first frequency subband, and averages the powers over time to obtain a received power.

In one embodiment, the act of listening is used by the UE to determine whether the first frequency subband is idle.

In one embodiment, the act of listening is used by the UE to determine whether the first frequency subband is available to transmit a radio signal.

In one embodiment, the act of listening is used by the UE to determine that the first frequency subband is idle at the first time-position.

In one embodiment, the act of listening is used by the UE to determine that the first frequency subband is available to transmit a radio signal at the first time-position.

In one embodiment, the first radio signal includes uplink data and uplink control information.

In one embodiment, the first radio signal includes Autonomous Uplink-Uplink Control Information (AUL-UCI).

In one embodiment, time-frequency resources occupied by the first radio signal belong to AUL resources.

In one embodiment, time resources occupied by the first radio signal belong to the first time window.

In one embodiment, the first time window is a continuous period of time.

In one embodiment, the first time window is a slot.

In one embodiment, the first time window is a slot occupied by the first radio signal.

In one embodiment, the first time window is a subframe.

In one embodiment, the first time window is a subframe occupied by the first radio signal.

In one embodiment, the first time window includes a positive integer number of consecutive multicarrier symbols.

In one embodiment, the first time window consists of a positive integer number of consecutive multicarrier symbols.

In one embodiment, the first time window consists of 7 consecutive multicarrier symbols.

In one embodiment, the first time window consists of 14 consecutive multicarrier symbols.

In one embodiment, the first time window includes a positive integer number of consecutive slots.

In one embodiment, the first time window includes a positive integer number of consecutive subframes.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the phrase that the act of listening is used for determining the first time-position refers that: the act of listening is used for determining that the first frequency subband is available to transmit the first radio signal at the first time-position.

In one embodiment, the phrase that the act of listening is used for determining the first time-position refers that: the act of listening is used for determining that the first frequency subband is idle at the first time-position.

In one embodiment, the phrase that the act of listening is used for determining the first time-position refers that: the act of listening is used for determining the first time-position from the L candidate time-positions.

In one embodiment, the L is equal to 1.

In one embodiment, the L is not greater than 2.

In one embodiment, the L is fixed to 2, and the first information and the time domain position of the first time window are used together for determining the L candidate time-position(s) in the first time window.

In one embodiment, the first information and the time domain position of the first time window are used together for determining the L candidate time-position(s) in the first time window.

In one embodiment, the L is 1 or 2, and the first information and the time domain position of the first time window are used together for determining the L candidate time-position(s) in the first time window and the L.

In one embodiment, the time domain position of the first time window includes a System Frame Number (SFN) of a radio frame to which the first time window belongs.

In one embodiment, the time domain position of the first time window includes a position of the first time window in a radio frame to which the first time window belongs.

In one embodiment, the time domain position of the first time window includes a position of a subframe to which the first time window belongs in a radio frame to which the first time window belongs.

In one embodiment, the time domain position of the first time window includes a position of a slot to which the first time window belongs in a radio frame to which the first time window belongs.

Embodiment 2

Figure 2:
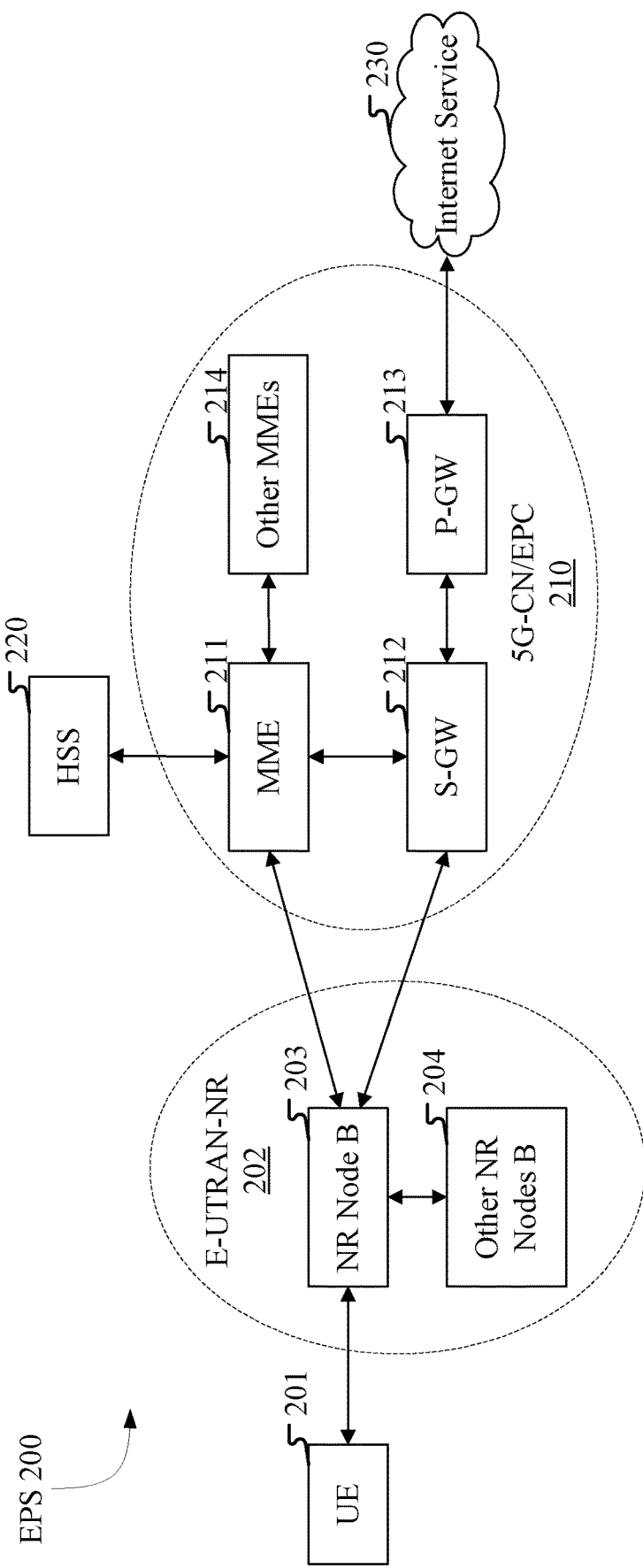
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of LTE, Long-Term Evolution Advanced (LTE-A) and future 5G systems. The LTE network architecture 200 may be called an Evolved Packet System (EPS) 200. The EPS 200 may include one or more UEs 201, an Evolution UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet service 230, wherein the UMTS represents Universal Mobile Telecommunications System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR 202 includes an NR node B (gNB) 203 and other gNBs 204. The gNB 203 provides UE 201 oriented user plane and control plane protocol terminations. The gNB 203 is connected to other gNBs 204 via an X2 interface (for example, backhaul). The gNB 203 may also be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing signalings between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the gNB 203 corresponds to the base station in the disclosure.

In one embodiment, the UE 201 corresponds to the UE in the disclosure.

In one embodiment, the UE 201 supports wireless communications performing data transmission on unlicensed spectrum.

In one embodiment, the gNB 203 supports wireless communications performing data transmission on unlicensed spectrum.

Embodiment 3

Figure 3:
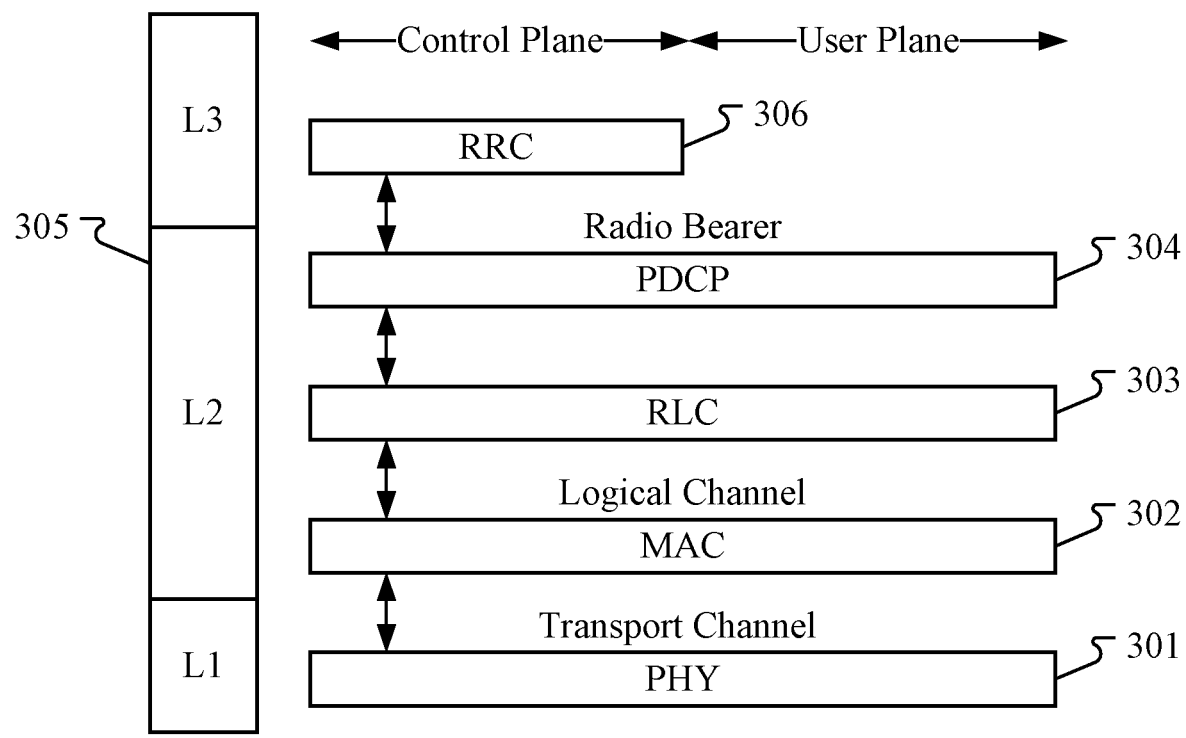
FIG. 3 is a diagram illustrating an embodiment of a radio protocol architecture of a user plane and a control plane according to one embodiment of the disclosure.

Embodiment 3 illustrates an example of a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first information in the disclosure is generated by the RRC sublayer 306.

In one embodiment, the first radio signal in the disclosure is generated by the PHY 301.

In one embodiment, the first uplink information in the disclosure is generated by the PHY 301.

In one embodiment, the first uplink information in the disclosure is generated by MAC sublayer 302.

In one embodiment, the first signaling in the disclosure is generated by the PHY 301.

In one embodiment, the first signaling in the disclosure is generated by the MAC sublayer 302.

In one embodiment, the second signaling in the disclosure is generated by the PHY 301.

In one embodiment, the second signaling in the disclosure is generated by the MAC sublayer 302.

Embodiment 4

Figure 4:
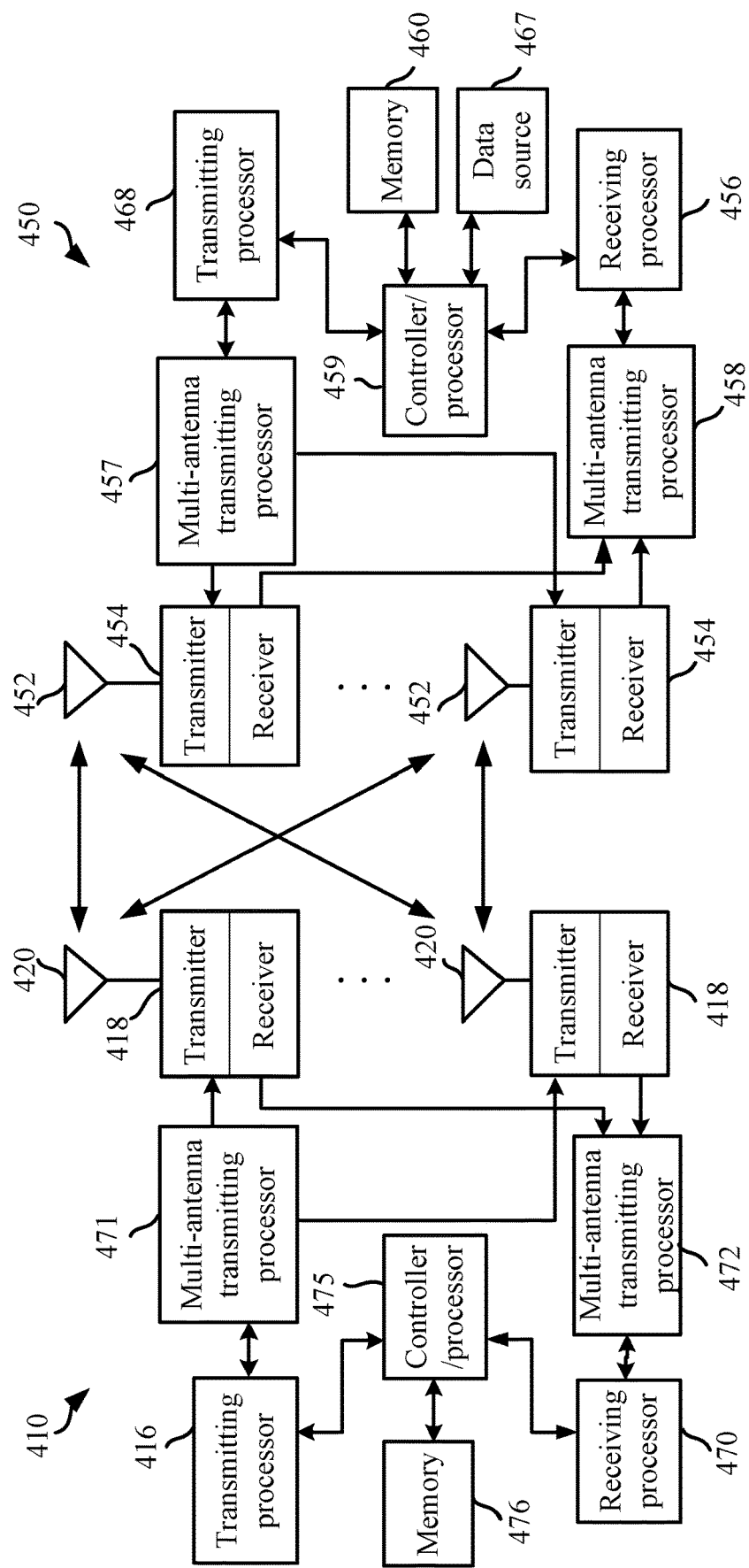
FIG. 4 is a diagram illustrating a New Radio (NR) node and a UE according to one embodiment of the disclosure.

Embodiment 4 illustrates an example of a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides functions of Layer 2. In downlink transmission, the controller/processor 475 provides header compression, encryption, packet segmentation and reordering, multiplexing between a logical channel and a transport channel, and a radio resource allocation for the UE 450 based on various priority metrics. The controller/processor 475 is also in charge of HARQ operation, retransmission of lost packets, and signalings to the UE 450. The transmitting processor 416 and the multi-antenna transmitting processor 471 performs various signal processing functions used for Layer 1 (that is, PHY). The transmitting processor 416 performs encoding and interleaving so as to ensure FEC (Forward Error Correction) at the UE 450 side and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In downlink transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In downlink transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In the uplink transmission, at the UE 450, the data source 467 provides a higher-layer packet to the controller/processor 459. The data source 467 illustrates all protocol layers above the L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of HARQ operation, retransmission of lost packets, and signalings to the gNB 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In uplink transmission, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least receives the first information in the disclosure, listens in the first frequency subband in the disclosure, and transmits the first radio signal in the disclosure in the first frequency subband starting from the first time-position in the disclosure. Herein, the first time-position is in a first time window, and the act of listening is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one embodiment, the UE 450 includes a memory that stores a computer readable instruction program. The computer readable instruction program generates an action when executed by at least one processor. The action includes: receiving the first information in the disclosure, listening in the first frequency subband in the disclosure, and transmitting the first radio signal in the disclosure in the first frequency subband starting from the first time-position in the disclosure. Herein, the first time-position is in a first time window, and the act of listening is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one subembodiment, the gNB 410 includes at least one processor and at least one memory. The at least one memory includes computer program codes. The at least one memory and the computer program codes are configured to be used in collaboration with the at least one processor. The gNB 410 at least transmits the first information in the disclosure, monitors the first radio signal in the disclosure in the first frequency subband in the disclosure, and receives the first radio signal in the first frequency subband starting from the first time-position in the disclosure. Herein, the first time-position is in a first time window, and the act of monitoring is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one subembodiment, the gNB 410 includes a memory that stores a computer readable instruction program. The computer readable instruction program generates an action when executed by at least one processor. The action includes: transmitting the first information in the disclosure, monitoring the first radio signal in the disclosure in the first frequency subband in the disclosure, and receiving the first radio signal in the first frequency subband starting from the first time-position in the disclosure. Herein, the first time-position is in a first time window, and the act of monitoring is used for determining the first time-position; the first time-position is one of L candidate time-position(s) in the first time window; the first information and a time domain position of the first time window are used together for determining at least one of the L and the L candidate time-position(s) in the first time window; and the L is a positive integer.

In one embodiment, the gNB 410 corresponds to the base station in the present disclosure.

In one embodiment, the UE 450 corresponds to the UE in the present disclosure.

In one embodiment, at least one of {the antenna 452, the receiver 454, the receiving processor 456, the multi-antenna receiving processor 458, the controller/processor 459, the memory 460, the data source 467} is used for receiving the first information in the disclosure; at least one of {the antenna 420, the transmitter 418, the transmitting processor 416, the multi-antenna transmitting processor 471, the controller/processor 475, the memory 476} is used for transmitting the first information in the disclosure.

In one embodiment, at least one of {the antenna 452, the receiver 454, the receiving processor 456, the multi-antenna receiving processor 458, the controller/processor 459} is used for listening in the first frequency subband in the disclosure.

In one embodiment, at least one of {the antenna 420, the receiver 418, the receiving processor 470, the multi-antenna receiving processor 472, the controller/processor 475, the memory 476} is used for receiving the first radio signal in the disclosure in the first frequency subband in the disclosure starting from the first time-position in the disclosure; at least one of {the antenna 452, the transmitter 454, the transmitting processor 468, the multi-antenna transmitting processor 457, the controller/processor 459, the memory 460, the data source 467} is used for transmitting the first radio signal in the disclosure in the first frequency subband in the disclosure starting from the first time-position in the disclosure.

In one embodiment, at least one of {the antenna 452, the receiver 454, the receiving processor 456, the multi-antenna receiving processor 458, the controller/processor 459} is used for selecting the first time window in the disclosure from the M time windows in the disclosure autonomously.

In one embodiment, at least one of {the antenna 452, the receiver 454, the receiving processor 456, the multi-antenna receiving processor 458, the controller/processor 459, the memory 460, the data source 467} is used for receiving the first signaling in the disclosure; at least one of {the antenna 420, the transmitter 418, the transmitting processor 416, the multi-antenna transmitting processor 471, the controller/processor 475, the memory 476} is used for transmitting the first signaling in the disclosure.

In one embodiment, at least one of {the antenna 452, the receiver 454, the receiving processor 456, the multi-antenna receiving processor 458, the controller/processor 459, the memory 460, the data source 467} is used for receiving the second signaling in the disclosure; at least one of {the antenna 420, the transmitter 418, the transmitting processor 416, the multi-antenna transmitting processor 471, the controller/processor 475, the memory 476} is used for transmitting the second signaling in the disclosure.

In one embodiment, at least one of {the antenna 452, the receiver 454, the receiving processor 456, the multi-antenna receiving processor 458, the controller/processor 459} is used for performing Q times of energy detections in Q time subpools on the first frequency subband in the disclosure respectively.

In one embodiment, at least one of {the antenna 420, the receiver 418, the receiving processor 470, the multi-antenna receiving processor 472, the controller/processor 475, the memory 476} is used for monitoring the first radio signal in the disclosure in the first frequency subband in the disclosure.

Embodiment 5

Figure 5:
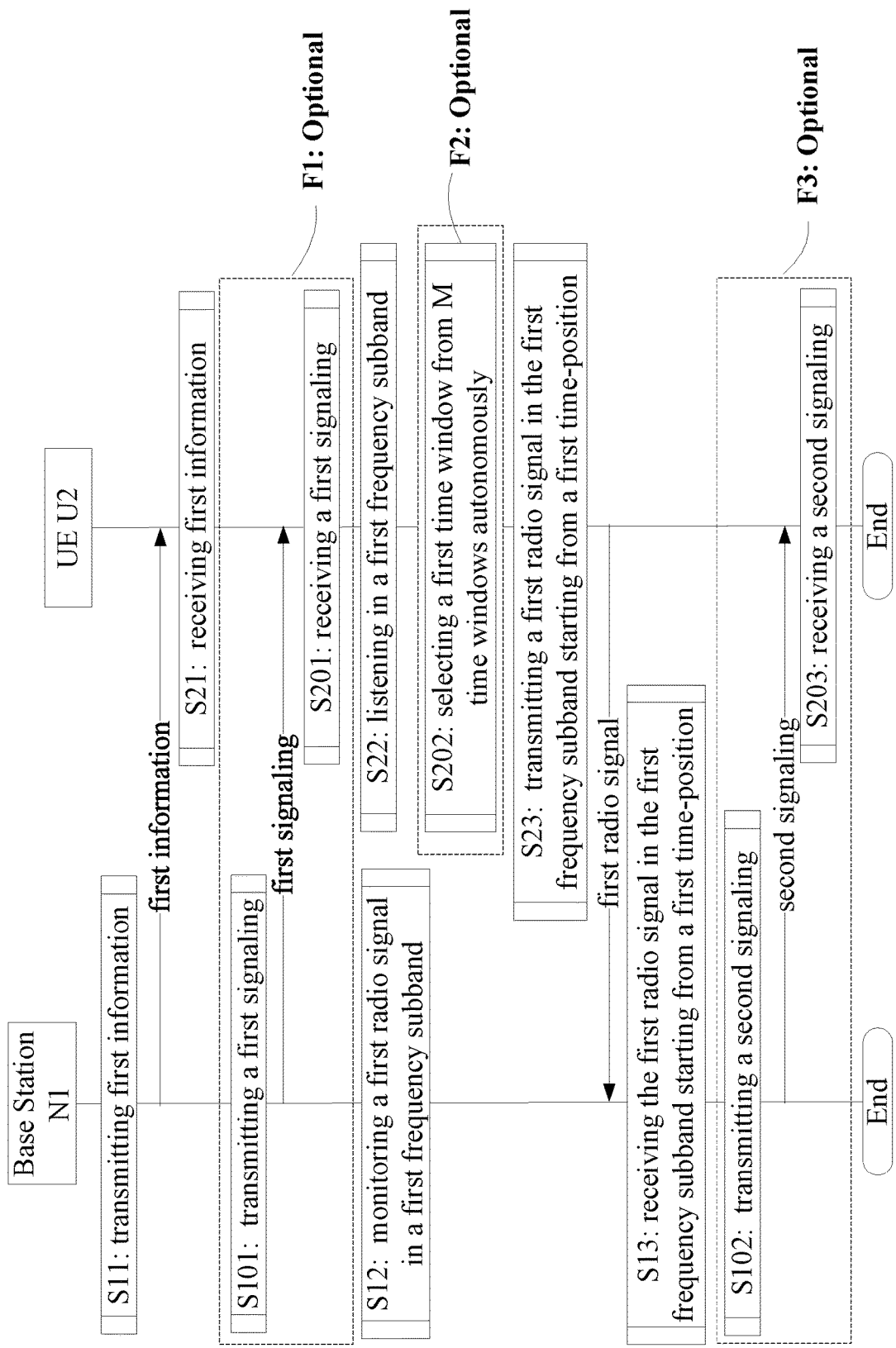
FIG. 5 is a flowchart of wireless transmission according to one embodiment of the disclosure.

Embodiment 5 illustrates an example of a flowchart of wireless transmission, as shown in FIG. 5. In FIG. 5, a base station N1 is a maintenance base station for a serving cell of a UE U2. In FIG. 5, steps in box F1 to box F3 are optional.

The N1 transmits first information in S11, transmits a first signaling in S101, monitors a first radio signal in a first frequency subband in S12, receives the first radio signal in the first frequency subband starting from a first time-position in S13, and transmits a second signaling in S102.

The U2 receives first information in S21, receives a first signaling in S201, listens in a first frequency subband in S22, selects a first time window from M time windows autonomously in S202, transmits a first radio signal in the first frequency subband starting from a first time-position in S23, and receives a second signaling in S203.

In Embodiment 5, the first time-position is in the first time window; the act of listening is used by the U2 to determine the first time-position; and the act of monitoring is used by the N1 to determine the first time window. The first time-position is one of L candidate time-position(s) in the first time window; the first information and a time domain position of the first time window are used together by the U2 to determine at least one of the L and the L candidate time-position(s) in the first time window; and the L is a positive integer. The first information is used by the U2 to determine the M time windows, and the first time window is one of the M time windows; and the M is a positive integer greater than 1. The first signaling indicates frequency resources occupied by the first radio signal. The second signaling indicates whether the first radio signal is correctly received.

In one embodiment, the act of listening is used by the U2 to determine that the first frequency subband is available to transmit the first radio signal at the first time-position.

In one embodiment, the act of listening is used by the U2 to determine the first time-position from the L candidate time-positions.

In one embodiment, the monitoring refers to a blind detection, that is, receiving a signal and performing a decoding operation; if the decoding is determined to be correct according to Cyclic Redundancy Check (CRC) bits, it is determined that the first radio signal is detected; otherwise, it is determined that the first radio signal is not detected.

In one embodiment, the monitoring refers to a coherent detection, that is, performing a coherent reception using an RS sequence of a DMRS of a physical layer channel in which the first radio signal is located, and measuring an energy of a signal obtained after the coherent reception. If the energy of the signal obtained after the coherent reception is greater than a first given threshold, it is determined that the first radio signal is detected; otherwise, it is determined that the first radio signal is not detected.

In one embodiment, the monitoring refers to an energy detection, that is, sensing energies of radio signals and averaging over time to obtain a received energy. If the received energy is greater than a second given threshold, it is determined that the first radio signal is detected; otherwise, it is determined that the first radio signal is not detected.

In one embodiment, the act of monitoring is used by the N1 to determine the first time-position from the L candidate time-positions.

In one embodiment, the act of monitoring is used for determining that the first radio signal is detected at the first time-position.

In one embodiment, the act of monitoring is used by the N1 to determine that the first radio signal is detected at the first time-position.

In one embodiment, the first time-position is the earliest candidate time-position among the L candidate time-positions when the first radio signal is detected.

In one embodiment, the act of monitoring is used by the N1 to determine the first time window from the M time windows.

In one embodiment, the act of monitoring is used for determining that the first radio signal is detected in the first time window.

In one embodiment, the act of monitoring is used by the N1 to determine that the first radio signal is detected in the first time window.

In one embodiment, the N1 monitors the first radio signal in M8 time windows respectively; the M8 time windows are a subset of the M time windows, the first time window is a latest time window among the M8 time windows, and the M8 is a positive integer not greater than the M.

In one embodiment, the first radio signal carries first uplink information, and the first uplink information is used for determining the first time-position.

In one embodiment, the first uplink information includes an AUL-UCL.

In one embodiment, the first uplink information indicates the M time windows.

In one embodiment, a position of the first time window in the M time window is used for determining at least one of the L and the L candidate time-position(s) in the first time window.

In one embodiment, the L is 1 or 2, and the position of the first time window in the M time window is used for determining the L candidate time-position(s) in the first time window and the L.

In one embodiment, the L is fixed to 2, and the position of the first time window in the M time window is used for determining the L candidate time-position(s) in the first time window.

In one embodiment, the position of the first time window in the M time window is used for determining the L candidate time-position(s) in the first time window.

In one embodiment, the act of listening is used by the U2 to select the first time window from the M time windows autonomously.

In one embodiment, the first signaling is a physical layer signaling.

In one embodiment, the first signaling is a dynamic signaling.

In one embodiment, the first signaling is transmitted on the first frequency subband.

In one embodiment, the first signaling is transmitted on a frequency band other than the first frequency subband.

In one embodiment, the first signaling is transmitted on a frequency band deployed in unlicensed spectrum.

In one embodiment, the first signaling is transmitted on a frequency band deployed in licensed spectrum.

In one embodiment, the first information and the first signaling are used together for determining M time frequency resources, the M time frequency resources occupy the M time windows in time domain respectively, and the M time frequency resources occupy same frequency resources in frequency domain.

In one embodiment, the listening includes: performing Q times of energy detections in Q time subpools on the first frequency subband respectively to obtain Q detection values, wherein the Q time subpools have an end time not later than the first time-position, Q1 detection value(s) among the Q detection values is(are) each less than a first threshold, the Q is a positive integer, and the Q1 is a positive integer not greater than the Q.

In one embodiment, the end time of the Q time subpools is the first time-position.

In one embodiment, the second signaling is a physical layer signaling.

In one embodiment, the second signaling is a dynamic signaling.

In one embodiment, the second signaling is transmitted on the first frequency subband.

In one embodiment, the second signaling is transmitted on a frequency band other than the first frequency subband.

In one embodiment, the second signaling is transmitted on a frequency band deployed in unlicensed spectrum.

In one embodiment, the second signaling is transmitted on a frequency band deployed in licensed spectrum.

In one embodiment, the second signaling includes an AUL-DFI (Downlink Feedback Indication).

In one embodiment, the first information is transmitted on a downlink physical layer data channel (that is, a downlink channel capable of carrying physical layer data).

In one subembodiment, the downlink physical layer data channel is a Physical Downlink Shared Channel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first radio signal is transmitted on an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a New Radio PUSCH (NR-PDSCH).

In one subembodiment, the uplink physical layer data channel is a Narrow Band PUSCH (NB-PUSCH).

In one embodiment, a transport channel corresponding to the first radio signal is an Uplink Shared Channel (UL-SCH).

In one embodiment, the first signaling is transmitted on a downlink physical layer control channel (that is, a downlink channel capable of carrying physical layer signalings only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the second signaling is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is a sPDCCH.

In one subembodiment, the downlink physical layer control channel is an NR-PDCCH.

In one subembodiment, the downlink physical layer control channel is an NB-PDCCH.

Embodiment 6

Figure 6:
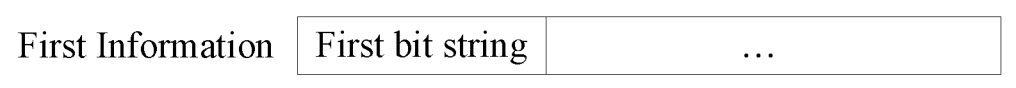

Embodiment 6 illustrates an example of a diagram of first information, as shown in FIG. 6.

In Embodiment 6, the first information is used for determining the M time windows in the disclosure, and the first time window in the disclosure is one of the M time windows; the M is a positive integer greater than 1.

In one embodiment, the first information is an Information Element (IE).

In one embodiment, the first information includes all or partial fields in an SPS-Config IE.

In one embodiment, the first information is an SPS-Config IE.

In one embodiment, the first information indicates the M time windows.

In one embodiment, the first information indicates the M time windows explicitly.

In one embodiment, the first information includes a first bit string, and the first bit string includes a positive integer number of bits. The first bit string indicates the M time windows.

In one subembodiment, the first bit string includes 40 bits.

In one subembodiment, the M time windows are a subset of N time windows, and the N is a positive integer not less than the M. The first bit string includes N bits, the N bits included in the first bit string are one-to-one corresponding to the N time windows. For any one given bit in the first bit string, if the any one given bit is equal to 1, a time window among the N time windows which is corresponding to the any one given bit is one of the M time windows. If the any one given bit is equal to 0, the time window among the N time windows which is corresponding to the any one given bit is not one of the M time windows.

Embodiment 7

Figure 7:
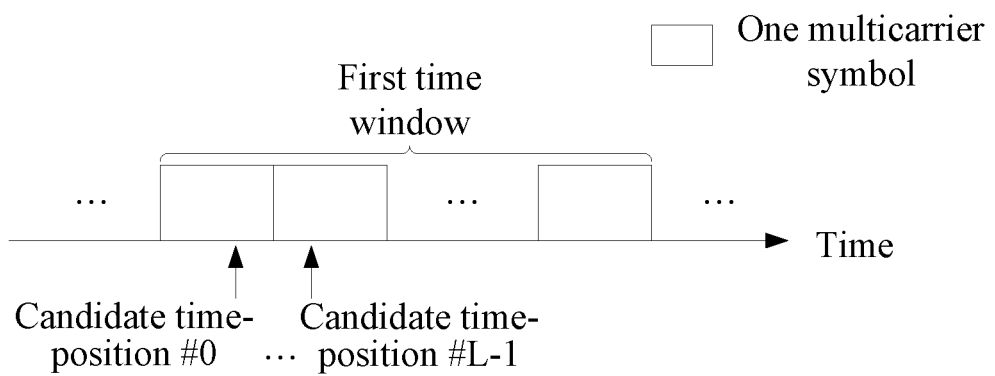
FIG. 7 is a diagram illustrating a distribution of L candidate time-positions in a first time window according to one embodiment of the disclosure.

Embodiment 7 illustrates an example of a diagram of a distribution of L candidate time-positions in a first time window, as shown in FIG. 7.

In Embodiment 7, the L candidate time-positions are located within the first time window, and the first time-position in the disclosure is one of the L candidate time-positions. The first time window includes a positive integer number of consecutive multicarrier symbols. In FIG. 7, the L candidate time-positions are indexed from #$\{0, \ldots, L-1\}$ respectively, and one grid represents one multicarrier symbol.

In one embodiment, at least two of the L candidate time-positions are within different multicarrier symbols in the first time window.

In one embodiment, any one given candidate time-position among the L candidate time-position(s) indicates a given symbol and a given time interval, the given symbol is one multicarrier symbol in the first time window, and the given time interval is a time interval between the any one given candidate time-position and the start time of the given symbol.

In one subembodiment, the given time interval is in unit of microsecond.

In one subembodiment, the given time interval is a non-negative real number.

Embodiment 8

Figure 8:
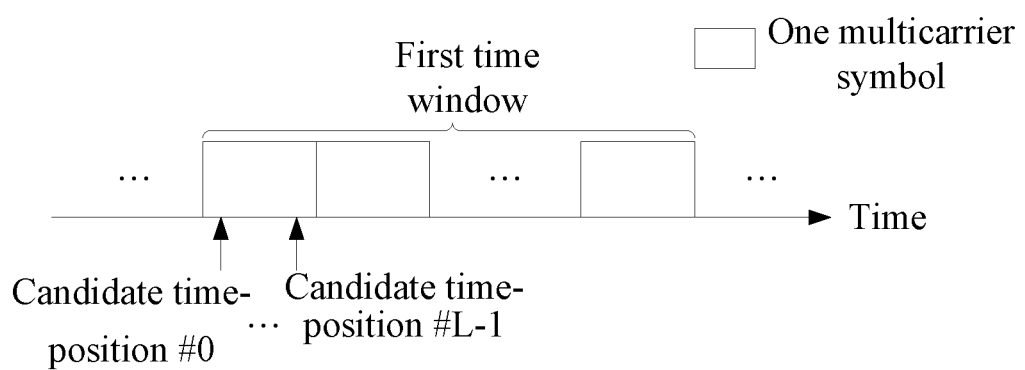
FIG. 8 is a diagram illustrating a distribution of L candidate time-positions in a first time window according to one embodiment of the disclosure.

Embodiment 8 illustrates an example of a diagram of a distribution of L candidate time-positions in a first time window, as shown in FIG. 8.

In Embodiment 8, the L candidate time-positions are located within the first time window, and the first time-position in the disclosure is one of the L candidate time-positions. The first time window includes a positive integer number of consecutive multicarrier symbols. In FIG. 8, the L candidate time-positions are indexed from #$\{0, \ldots, L-1\}$ respectively, and one grid represents one multicarrier symbol.

In one embodiment, the L candidate time-positions are within one same multicarrier symbol in the first time window.

Embodiment 9

Figure 9:
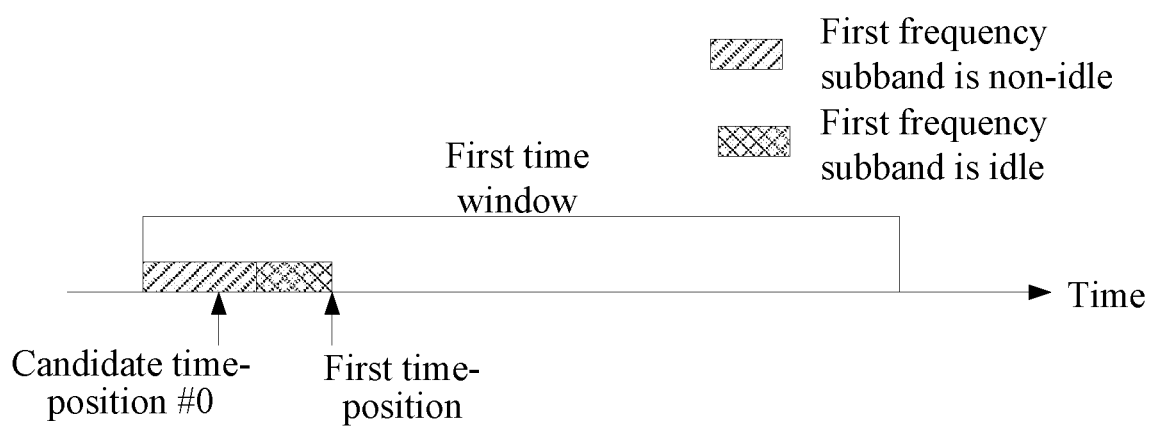
FIG. 9 is a diagram illustrating a case in which the act of listening is used for determining a first time-position from L candidate time-positions according to one embodiment of the disclosure.

Embodiment 9 illustrates an example of a diagram of a case in which the act of listening is used for determining a first time-position from L candidate time-positions, as shown in FIG. 9.

In Embodiment 9, the act of listening is used for determining the first time-position from the L candidate time-positions in the first time window in the disclosure. The act of listening is used for determining whether the first frequency subband in the disclosure is idle, and the first time-position is an earliest candidate time-position among the L candidate time-positions when the first frequency subband is determined to be idle. In FIG. 9, the first frequency subband is non-idle in the time period represented by the grid filled by left slashes, and is idle in the time period represented by the grid filled by cross lines. In FIG. 9, the candidate time-position #0 is the earliest candidate time-position among the L candidate time-positions.

In one embodiment, the act of listening is used for determining whether the first frequency subband is idle, and the first time-position is an earliest candidate time-position among the L candidate time-positions when the first frequency subband is determined to be idle.

In one embodiment, the act of listening is used for determining whether the first frequency subband is available to transmit a radio signal, and the first time-position is an earliest candidate time-position among the L candidate time-positions when the first frequency subband is determined to be available to transmit a radio signal.

In one embodiment, the act of listening is used for determining that the first frequency subband is non-idle at the candidate time-position #0, and the candidate time-position #0 is before the first time-position in time domain.

In one embodiment, the act of listening is used for determining that the first frequency subband is unavailable to transmit a radio signal at the candidate time-position #0, and the candidate time-position #0 is before the first time-position in time domain.

In one embodiment, the act of listening is used for determining that the first frequency subband is non-idle in the time period represented by the grid filled by left slashes in FIG. 9.

In one embodiment, the act of listening is used for determining that the first frequency subband is idle in the time period represented by the grid filled by cross lines in FIG. 9.

In one embodiment, the L is equal to 2.

Embodiment 10

Figure 10:
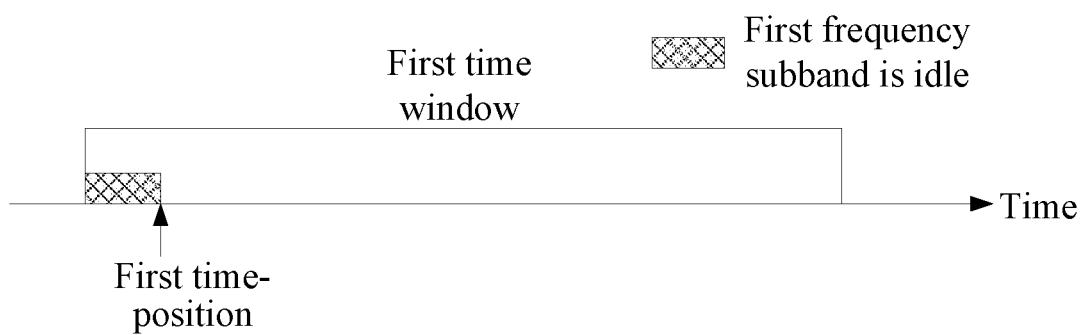
FIG. 10 is a diagram illustrating a case in which the act of listening is used for determining a first time-position according to one embodiment of the disclosure.

Embodiment 10 illustrates an example of a diagram of a case in which the act of listening is used for determining a first time-position, as shown in FIG. 10.

In Embodiment 10, the act of listening is used for determining whether the first frequency subband in the disclosure is idle, and the act of listening is used for determining that the first frequency subband is idle at the first time-position. In FIG. 10, the first frequency subband is idle in the time period represented by the grid filled by cross lines.

In one embodiment, the act of listening is used for determining that the first frequency subband is available to transmit the first radio signal at the first time-position.

In one embodiment, the act of listening is used for determining that the first frequency subband is idle at the first time-position.

In one embodiment, the act of listening is used for determining that the first frequency subband is idle in the time period represented by the grid filled by cross lines in FIG. 10.

Embodiment 11

Figure 11:
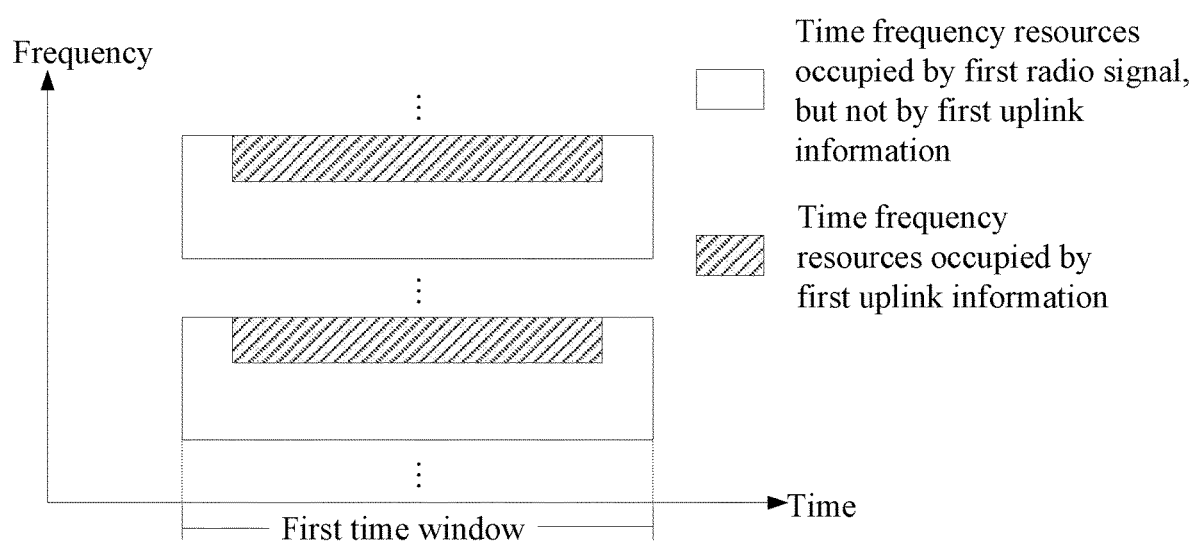
FIG. 11 is a diagram illustrating a first radio signal carrying first uplink information according to one embodiment of the disclosure.

Embodiment 11 illustrates an example of a diagram of a first radio signal carrying first uplink information, as shown in FIG. 11.

In Embodiment 11, the first radio signal carries the first uplink information, and the first uplink information is used for determining the first time-position. Time resources occupied by the first radio signal belong to the first time window. The first time window includes a positive integer number of consecutive multicarrier symbols. In FIG. 11, the blank box represents time frequency resources occupied by the first radio signal, but not by the first uplink information; and the box filled by left slashes represents time frequency resources occupied by the first uplink information.

In one embodiment, the first uplink information carries an AUL-UCI.

In one embodiment, the time resources occupied by the first radio signal are the first time window.

In one embodiment, the first uplink information does not occupy the earliest multicarrier symbol and the latest multicarrier symbol in the first time window.

In one embodiment, the first uplink information does not occupy (a) multicarrier symbol(s) before a reference symbol in the first time window, and the reference symbol is a multicarrier symbol where the latest candidate time-position among the L candidate time-position(s) is located.

In one embodiment, the time resources occupied by the first uplink information are located within the time resources occupied by the first radio signal.

In one embodiment, time resources occupied by the first uplink information are a subset of the time resources occupied by the first radio signal.

In one embodiment, the phrase that the first radio signal carries first uplink information refers that: the first radio signal carries a bit block corresponding to first uplink information.

In one embodiment, the phrase that the first radio signal carries first uplink information refers that: the first radio signal is an output after a bit block corresponding to the first uplink information is processed sequentially through Channel Coding, Scrambling, Modulation Mapper, Layer Mapper, Precoding, Resource Element Mapper, and Generation of Multicarrier Symbols.

In one embodiment, the phrase that the first radio signal carries first uplink information refers that: the first radio signal is an output after a bit block corresponding to the first uplink information is processed sequentially through Channel Coding, Scrambling, Modulation Mapper, Layer Mapper, Transform Precoder (used for generating complex-value signals), Precoding, Resource Element Mapper, and Generation of Multicarrier Symbols.

In one embodiment, the phrase that the first radio signal carries first uplink information refers that: the first radio signal is an output after a bit block corresponding to the first uplink information is processed sequentially through Transport Block level Cyclic Redundancy Check (CRC) Attachment, Segmentation, Coding Block level CRC Attachment, Channel Coding, Rate Matching, Concatenation, Scrambling, Modulation Mapper, Layer Mapper, Precoding, Resource Element Mapper, and Generation of Multicarrier Symbols.

In one embodiment, the phrase that the first radio signal carries first uplink information refers that: a bit block corresponding to the first uplink information is used for generating the first radio signal.

In one embodiment, the generation of multicarrier symbols refers to generation of OFDM symbols.

In one embodiment, the generation of multicarrier symbols refers to generation of SC-FDMA symbols.

In one embodiment, the generation of multicarrier symbols refers to generation of DFT-S-OFDM symbols.

In one embodiment, a bit block corresponding to the first uplink information includes a first information bit block and a first check bit block, and the first check bit block is generated by a CRC bit block of the first information bit block.

Embodiment 12

Figure 12:
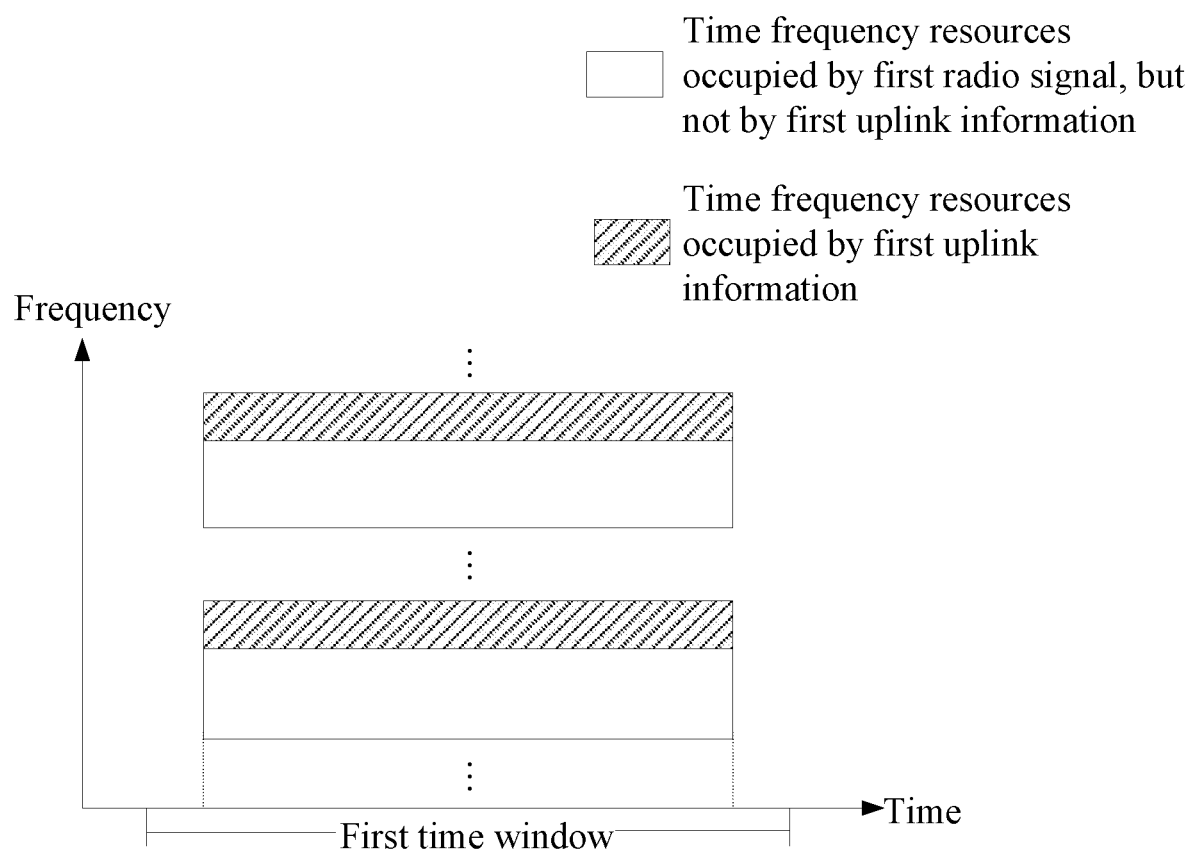
FIG. 12 is a diagram illustrating a first radio signal carrying first uplink information according to one embodiment of the disclosure.

Embodiment 12 illustrates an example of a diagram of a first radio signal carrying first uplink information, as shown in FIG. 12.

In Embodiment 12, the first radio signal carries the first uplink information, and the first uplink information is used for determining the first time-position. Time resources occupied by the first radio signal belong to the first time window. The first time window includes a positive integer number of consecutive multicarrier symbols. In FIG. 12, the blank box represents time frequency resources occupied by the first radio signal, but not by the first uplink information; and the box filled by left slashes represents time frequency resources occupied by the first uplink information.

In one embodiment, the time resources occupied by the first radio signal are within the first time window.

In one embodiment, the time resources occupied by the first radio signal are a subset of the first time window.

Embodiment 13

Embodiment 13 illustrates an example of a diagram of first uplink information, as shown in FIG. 13.

In Embodiment 13, the first uplink information includes first sub-information, second sub-information, third sub-information, fourth sub-information, fifth sub-information, sixth sub-information and seventh sub-information. The first sub-information indicates the first time-position in the disclosure; the second sub-information indicates a Hybrid Automatic Repeat reQuest (HARQ) process number corresponding to the first radio signal in the disclosure; the third sub-information indicates a Redundancy Version (RV) corresponding to the first radio signal; the fourth sub-information indicates a New Data Indicator (NDI) corresponding to the first radio signal; the fifth sub-information indicates a UE Identity (ID) corresponding to the UE in the disclosure; the sixth sub-information indicates the end time of time resources occupied by the first radio signal; and the seventh sub-information indicates a Channel Occupy Time (COT) Sharing indication.

In one embodiment, the first uplink information includes an AUL-UCI.

In one embodiment, the first uplink information indicates the first time-position.

In one embodiment, the first uplink information indicates the first time-position from the L candidate time-positions in the disclosure.

In one embodiment, the first uplink information includes a first indicator bit, the first indicator bit indicates the first sub-information, and the L in the disclosure is equal to 2. If the first indicator bit is equal to 0, the first time-position is an earlier one of the L candidate time-positions in time domain. If the first indicator bit is equal to 1, the first time-position is a later one of the L candidate time-positions in time domain.

In one embodiment, the first uplink information includes a first indicator bit, the first indicator bit indicates the first sub-information, and the L in the disclosure is equal to 2. If the first indicator bit is equal to 1, the first time-position is an earlier one of the L candidate time-positions in time domain. If the first indicator bit is equal to 0, the first time-position is a later one of the L candidate time-positions in time domain In one embodiment, the first uplink information includes a HARQ process number.

In one embodiment, the first uplink information includes second sub-information, and the second sub-information indicates a HARQ process number corresponding to the first radio signal.

In one embodiment, the first uplink information includes an RV.

In one embodiment, the first uplink information includes third sub-information, and the third sub-information indicates an RV corresponding to the first radio signal.

In one embodiment, the first uplink information includes an NDI.

In one embodiment, the first uplink information includes fourth sub-information, and the fourth sub-information indicates an NDI corresponding to the first radio signal.

In one embodiment, the first uplink information includes a UE ID.

In one embodiment, the UE ID is a Cell-Radio Network Temporary Identifier (C-RNTI).

In one embodiment, the first uplink information includes fifth sub-information, and the fifth sub-information indicates a UE ID corresponding to the UE.

In one embodiment, the first uplink information indicates the end time of the time resources occupied by the first radio signal.

In one embodiment, the first uplink information includes sixth sub-information, and the sixth sub-information indicates the end time of the time resources occupied by the first radio signal.

In one embodiment, the first uplink information includes a COT Sharing indication.

In one embodiment, the first uplink information includes seventh sub-information, and the seventh sub-information indicates a COT Sharing indication.

Embodiment 14

Figure 14:
FIG. 14 is a diagram illustrating a distribution of M time windows in time domain according to one embodiment of the disclosure.

Embodiment 14 illustrates an example of a diagram of a distribution of M time windows in time domain, as shown in FIG. 14.

In Embodiment 14, the first information in the disclosure is used for determining the M time windows, and the first time window in the disclosure is one of the M time windows; the M is a positive integer greater than 1. In FIG. 14, the M time windows are indexed from #$\{0, \ldots, M-1\}$ respectively.

In one embodiment, any two of the M time windows are orthogonal (non-overlapping) to one another in time domain.

In one embodiment, any two adjacent time windows among the M time windows are not contiguous in time domain.

In one embodiment, at least two adjacent time windows among the M time windows are contiguous in time domain.

In one embodiment, any two of the M time windows occupy a same length of time resources.

In one embodiment, at least two of the M time windows occupy different lengths of time resources.

In one embodiment, any one of the M time windows is a continuous period of time.

In one embodiment, any one of the M time windows is a slot.

In one embodiment, any one of the M time windows is a subframe.

In one embodiment, any one of the M time windows includes a positive integer number of consecutive multicarrier symbols.

In one embodiment, any one of the M time windows includes a positive integer number of consecutive slots.

In one embodiment, any one of the M time windows includes a positive integer number of consecutive subframes.

Embodiment 15

Figure 15:
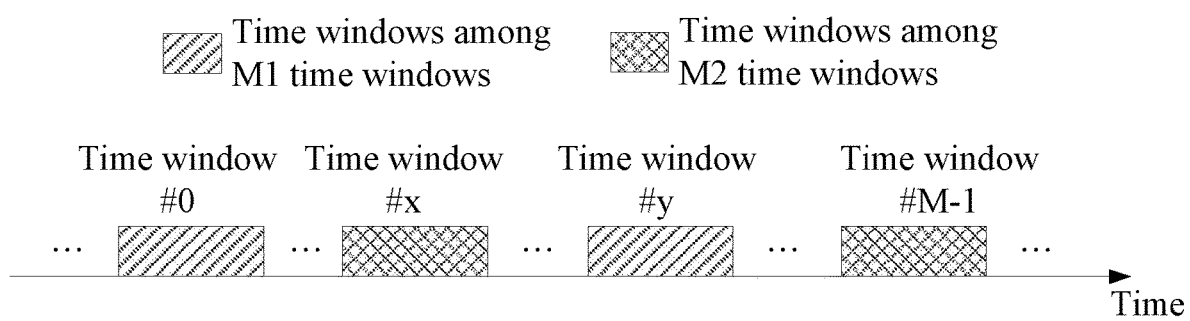
FIG. 15 is a diagram illustrating a case in which a position of a first time window in M time windows is used for determining L candidate time-position(s) in the first time window according to one embodiment of the disclosure.

Embodiment 15 illustrates an example of a diagram of a case in which a position of a first time window in M time windows is used for determining L candidate time-position(s) in the first time window, as shown in FIG. 15.

In Embodiment 15, the first time window is one of the M time windows; the position of the first time window in the M time windows is used for determining the L candidate time-position(s) in the first time window. The M time windows include M1 time windows and M2 time windows, the M1 time windows and the M2 time windows are subsets of the M time windows respectively, and the M1 and the M2 are positive integers less than the M respectively. If the first time window is one of the M1 time windows, the L candidate time-position(s) belong to a first candidate time-position set; if the first time windows is one of the M2 time windows, the L candidate time-position(s) belong to a second candidate time-position set. The first candidate time-position set and the second candidate time-position set include a positive integer number of candidate time-position(s) in the first time window respectively.

In FIG. 15, the M time windows are indexed from #$\{0, \ldots, x, \ldots, y, \ldots, M-1\}$ respectively, where the x and the y are non-negative integers less than the M respectively, and the y is greater than the x; boxes filled by left slashes represent time windows among the M1 time windows, and boxes filled by cross lines represent time windows among the M2 time windows.

In one embodiment, the position of the first time window in the M time windows is used for determining the L candidate time-position(s) in the first time window.

In one embodiment, the L is fixed to 2.

In one embodiment, the L is fixed to 1.

In one embodiment, the L is fixed.

In one embodiment, the M1 time windows and the M2 time windows have no intersection there-between, that is to say, none of the M time windows belongs to both the M1 time windows and the M2 time windows.

In one embodiment, at least one candidate time-position in the first candidate time-position set does not belong to the second candidate time-position set.

In one embodiment, at least one candidate time-position in the second candidate time-position set does not belong to the first candidate time-position set.

In one embodiment, the first information in the disclosure is used for determining the M1 time windows, the M2 time windows, the first candidate time-position set and the second candidate time-position set.

In one embodiment, the first information in the disclosure indicates the M1 time windows, the M2 time windows, the first candidate time-position set and the second candidate time-position set.

In one embodiment, the number of candidate time-position(s) included in the first candidate time-position set is equal to the L.

In one embodiment, the number of candidate time-position(s) included in the first candidate time-position set is greater than the L.

In one embodiment, the number of candidate time-position(s) included in the second candidate time-position set is equal to the L.

In one embodiment, the number of candidate time-position(s) included in the second candidate time-position set is greater than the L.

In one embodiment, the M time windows consist of the M1 time windows and the M2 time windows.

In one embodiment, at least one of the M time windows does not belong to the M1 time windows and the M2 time windows.

Embodiment 16

Figure 16:
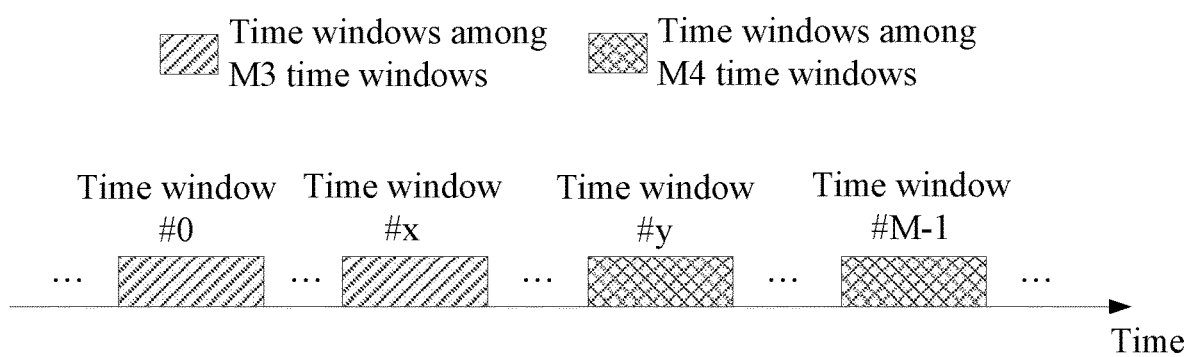
FIG. 16 is a diagram illustrating a case in which a position of a first time window in M time windows is used for determining L according to one embodiment of the disclosure.

Embodiment 16 illustrates an example of a diagram of a case in which a position of a first time window in M time windows is used for determining L, as shown in FIG. 16.

In Embodiment 16, the first time window is one of the M time windows; the position of the first time window in the M time windows is used for determining the L. The M time windows include M3 time windows and M4 time windows, the M3 time windows and the M4 time windows are subsets of the M time windows respectively, and the M3 and the M4 are positive integers less than the M respectively. If the first time window is one of the M3 time windows, the L is equal to L1; if the first time windows is one of the M4 time windows, the L is equal to L2. The L1 and the L2 are unequal positive integers.

In FIG. 16, the M time windows are indexed from # {0, . . . , x, . . . y, . . . , M−1} respectively, where the x and the y are non-negative integers less than the M respectively, and the y is greater than the x; boxes filled by left slashes represent time windows among the M3 time windows, and boxes filled by cross lines represent time windows among the M4 time windows.

In one embodiment, the L is not fixed.

In one embodiment, the L is 1 or 2.

In one embodiment, the M3 time windows and the M4 time windows have no intersection there-between, that is to say, none of the M time windows belongs to both the M3 time windows and the M4 time windows.

In one embodiment, the L1 is equal to 1, and the L2 is equal to 2.

In one embodiment, the first information in the disclosure is used for determining the M3 time windows, the M4 time windows, the L1 and the L2.

In one embodiment, the first information in the disclosure indicates the M3 time windows, the M4 time windows, the L1 and the L2.

In one embodiment, the M time windows consist of the M3 time windows and the M4 time windows.

In one embodiment, at least one of the M time windows does not belong to the M3 time windows and the M4 time windows.

Embodiment 17

Figure 17:
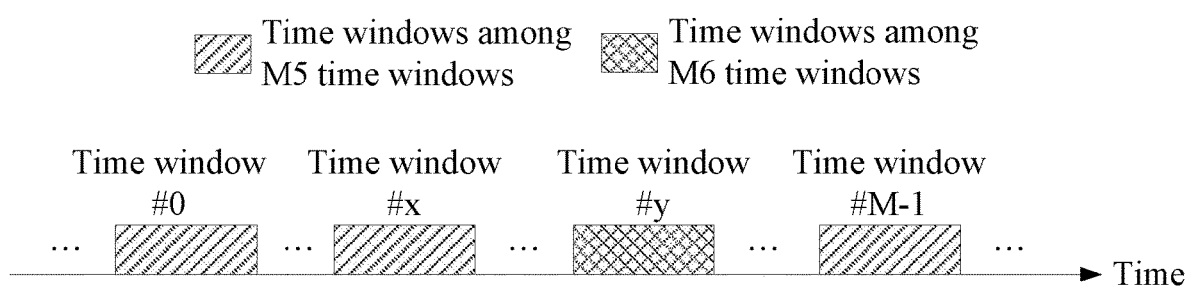
FIG. 17 is a diagram illustrating a case in which a position of a first time window in M time windows is used for determining L candidate time-position(s) in the first time window and the L according to one embodiment of the disclosure.

Embodiment 17 illustrates an example of a diagram of a case in which a position of a first time window in M time windows is used for determining L candidate time-position(s) in the first time window and the L, as shown in FIG. 17.

In Embodiment 17, the first time window is one of the M time windows; the position of the first time window in the M time windows is used for determining the L candidate time-position(s) in the first time window and the L. The M time windows include M5 time windows and M6 time windows, the M5 time windows and the M6 time windows are subsets of the M time windows respectively, and the M5 and the M6 are positive integers less than the M respectively. If the first time window is one of the M5 time windows, the L candidate time-position(s) belong to a third candidate time-position set, and the L is equal to L3; if the first time windows is one of the M6 time windows, the L candidate time-position(s) belong to a fourth candidate time-position set, and the L is equal to L4. The third candidate time-position set includes L3 candidate time-position(s) in the first time window, the fourth candidate time-position set includes L4 candidate time-position(s) in the first time window, the L3 and the L4 are unequal positive integers.

In FIG. 17, the M time windows are indexed from # {0, . . . , x, . . . , y, . . . , M−1} respectively, where the x and the y are non-negative integers less than the M respectively, and the y is greater than the x; boxes filled by left slashes represent time windows among the M5 time windows, and boxes filled by cross lines represent time windows among the M6 time windows.

In one embodiment, the position of the first time window in the M time windows is used for determining the L candidate time-position(s) in the first time window and the L.

In one embodiment, the L is 1 or 2.

In one embodiment, the M5 time windows and the M6 time windows have no intersection there-between, that is to say, none of the M time windows belongs to both the M5 time windows and the M6 time windows.

In one embodiment, the first information in the disclosure is used for determining the M5 time windows, the M6 time windows, the third candidate time-position set, the fourth candidate time-position set, the L3 and the L4.

In one embodiment, the first information in the disclosure indicates the M5 time windows, the M6 time windows, the third candidate time-position set, the fourth candidate time-position set, the L3 and the L4.

In one embodiment, if the first time window is one of the M5 time windows, the L candidate time-position(s) are the L3 candidate time-position(s).

In one embodiment, if the first time window is one of the M6 time windows, the L candidate time-position(s) are the L4 candidate time-position(s).

In one embodiment, at least one candidate time-position in the third candidate time-position set does not belong to the fourth candidate time-position set.

In one embodiment, at least one candidate time-position in the fourth candidate time-position set does not belong to the third candidate time-position set.

In one embodiment, the M time windows consist of the M5 time windows and the M5 time windows.

In one embodiment, at least one of the M time windows does not belong to the M5 time windows and the M6 time windows.

Embodiment 18

Figure 18:
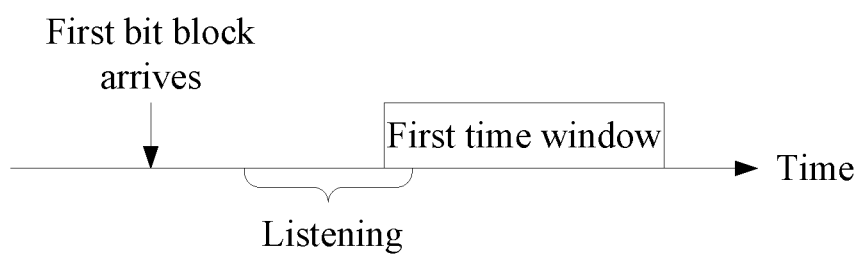
FIG. 18 is a diagram of a UE selecting a first time window from M time windows autonomously according to one embodiment of the disclosure.

Embodiment 18 illustrates an example of a diagram of a UE selecting a first time window from M time windows autonomously, as shown in FIG. 18.

In Embodiment 18, the first radio signal in the disclosure is transmitted in the first time window, the first radio signal carries a first bit block, and the first bit block includes a positive integer number of bits. The start time of the first time window is later than the arrival time of the first bit block. The act of listening in the disclosure is used for selecting the first time window from the M time windows autonomously.

In one embodiment, the arrival time of the first bit block refers to the time when the first bit block arrives at the physical layer.

In one embodiment, the act of listening is used for selecting the first time window from the M time windows autonomously.

In one embodiment, the act of listening is used for determining that the first frequency subband is available to transmit a radio signal in the first time window.

In one embodiment, the first time window is the earliest time window among the M time windows of which the start time is later than the arrival time of the first bit block and in which the first frequency subband in the disclosure is determined to be available to transmit a radio signal.

In one embodiment, the act of listening is used for determining that the first frequency subband is idle in the first time window.

In one embodiment, the first time window is an earliest time window among the M time windows of which the start time is later than the arrival time of the first bit block and in which the first frequency subband in the disclosure is idle.

In one embodiment, the first bit block includes uplink data.

Embodiment 19

Embodiment 19 illustrates an example of a diagram of a first signaling, as shown in
FIG. 19.

In Embodiment 19, the first signaling includes a first field, a second field, a third field, a fourth field and a fifth field. The first field in the first signaling indicates frequency resources occupied by the first radio signal in the disclosure; the second field in the first signaling indicates an MCS of the first radio signal; the third field in the first signaling indicates a transmitting antenna port of the first radio signal; the fourth field in the first signaling indicates a cyclic shift and an Orthogonal Cover Code (OCC) of a DMRS of a physical layer channel in which the first radio signal is located; and the fifth field in the first signaling is an AUL Downlink Feedback Indication (AUL DFI) flag.

In one embodiment, the first signaling is a physical layer signaling.

In one embodiment, the first signaling is a dynamic signaling.

In one embodiment, the first signaling includes Downlink Control Information (DCI).

In one embodiment, the first signaling is UE specific.

In one embodiment, the signaling identity of the first signaling is a Semi-Persistent Scheduling-Cell-Radio Network Temporary Identifier (SPS-C-RNTI).

In one embodiment, the first signaling is a DCI identified by an SPS-C-RNTI.

In one embodiment, an SPS-C-RNTI is used for generating an RS sequence of a DMRS corresponding to the first signaling.

In one embodiment, a CRC bit sequence of the first signaling is scrambled with an SPS-C-RNTI.

In one embodiment, a payload size of the first signaling is equal to a payload size of a DCI Format 0A or a payload size of a DCI Format 4A.

In one subembodiment, specific definitions of the DCI Format 0A and DCI Format 4A can refer to Chapter 5.3 in 3GPP TS36.212.

In one embodiment, the first signaling is used for AUL activation.

In one embodiment, the first signaling is used for activating the M time windows in the disclosure.

In one embodiment, the first signaling indicates explicitly the frequency resources occupied by the first radio signal.

In one embodiment, the first signaling includes a first field, and the first field in the first signaling indicates the frequency resources occupied by the first radio signal.

In one embodiment, the first field in the first signaling includes partial or all information in a Resource Block (RB) assignment field, and specific definitions of the RB assignment field can refer to Chapter 5.3 in 3GPP TS36.212.

In one embodiment, the first field in the first signaling is an RB assignment field, and specific definitions of the RB assignment can refer to Chapter 5.3 in 3GPP TS36.212.

In one embodiment, the first field in the first signaling consists of 5 or 6 bits.

In one embodiment, the first signaling indicates an MCS of the first radio signal.

In one embodiment, the first signaling includes a second field, and the second field in the first signaling indicates an MCS of the first radio signal.

In one embodiment, the second field in the first signaling includes all or partial information in an MCS and RV field, and specific definitions of the MCS and RV field can refer to Chapter 5.3 in 3GPP TS36.212.

In one embodiment, the second field in the first signaling is an MCS and RV field, and specific definitions of the MCS and RV field can refer to Chapter 5.3 in 3GPP TS36.212.

In one embodiment, the second field in the first signaling consists of 5 bits.

In one embodiment, the second field in the first signaling consists of 10 bits.

In one embodiment, the first signaling is used for determining a transmitting antenna port of the first radio signal.

In one embodiment, the first signaling includes a third field, and the third field in the first signaling indicates a transmitting antenna port of the first radio signal.

In one embodiment, the third field in the first signaling includes partial or all information in a Precoding Information and Number of Layers field, and specific definitions of the Precoding Information and Number of Layers field can refer to Chapter 5.3 in 3GPP TS36.212.

In one embodiment, the third field in the first signaling is a Precoding Information and Number of Layers field, and specific definitions of the Precoding Information and Number of Layers field can refer to Chapter 5.3 in 3GPP TS36.212.

In one embodiment, the third field in the first signaling consists of 3, 4, 5 or 6 bits.

In one embodiment, the first signaling is used for determining a cyclic shift and an OCC of a DMRS of a physical layer channel carrying the first radio signal.

In one embodiment, the first signaling includes a fourth field, and the fourth field in the first signaling indicates a cyclic shift and an OCC of a DMRS of a physical layer channel carrying the first radio signal.

In one embodiment, the fourth field in the first signaling includes all or partial information in a Cyclic Shift for DMRS and OCC Index field, and specific definitions of the Cyclic Shift for DMRS and OCC Index field can refer to Chapter 5.3 in 3GPP TS36.212.

In one embodiment, the fourth field in the first signaling is a Cyclic Shift for DMRS and OCC Index field, and specific definitions of the Cyclic Shift for DMRS and OCC Index field can refer to Chapter 5.3 in 3GPP TS36.212.

In one embodiment, the fourth field in the first signaling consists of 3 bits.

In one embodiment, the first signaling includes a fifth field, and the fifth field in the first signaling is an AUL DFI flag.

In one embodiment, the fifth field in the first signaling consists of 1 bit.

Embodiment 20

Embodiment 20 illustrates an example of a diagram of a second signaling, as shown in FIG. 20.

In Embodiment 20, the second signaling includes a sixth field, a seventh field, an eighth field, a ninth field and a tenth field. The sixth field in the second signaling indicates the first frequency subband in the disclosure; the seventh field in the second signaling is an AUL DFI flag; the eighth field in the second signaling indicates whether the first radio signal in the disclosure is correctly received; the ninth field in the second signaling indicates a Transmitter Power Control (TPC); and the tenth field in the second signaling indicates a Transmitted Precoding Matrix Indicator (TPMI).

In one embodiment, the second signaling is a physical layer signaling.

In one embodiment, the second signaling is a dynamic signaling.

In one embodiment, the second signaling includes a DCI.

In one embodiment, the second signaling is UE specific.

In one embodiment, the signaling identity of the second signaling is an SPS-C-RNTI.

In one embodiment, the second signaling is a DCI identified by an SPS-C-RNTI.

In one embodiment, an SPS-C-RNTI is used for generating an RS sequence of a DMRS corresponding to the second signaling.

In one embodiment, a CRC bit sequence of the second signaling is scrambled with an SPS-C-RNTI.

In one embodiment, the second signaling and the first signaling have the same signaling identity.

In one embodiment, the second signaling and the first signaling are DCIs identified by the same RNTI.

In one embodiment, the same RNTI is used for generating RS sequences of DMRSs corresponding to the second signaling and the first signaling.

In one embodiment, a CRC bit sequence of the second signaling and a CRC bit sequence of the first signaling are scrambled with the same RNTI.

In one embodiment, a payload size of the second signaling is equal to a payload size of a DCI Format 0A or a payload size of a DCI Format 4A.

In one subembodiment, specific definitions of the DCI Format 0A and DCI Format 4A can refer to Chapter 5.3 in 3GPP TS36.212.

In one embodiment, a payload size of the second signaling is equal to a payload size of the first signaling.

In one embodiment, the second signaling includes an AUL-DFI.

In one embodiment, the second signaling indicates the first frequency subband.

In one embodiment, the second signaling includes a sixth field, and the sixth field in the second signaling indicates the first frequency subband.

In one embodiment, the sixth field in the second signaling includes all or partial information in a Carrier Indicator field, and specific definitions of the Carrier Indicator field can refer to Chapter 5.3 in 3GPP T S36.212.

In one embodiment, the sixth field in the second signaling is a Carrier Indicator field, and specific definitions of the Carrier Indicator field can refer to Chapter 5.3 in 3GPP TS36.212.

In one embodiment, the sixth field in the second signaling consists of 3 bits.

In one embodiment, the second signaling includes a seventh field, and the seventh field in the second signaling is an AUL DFI flag.

In one embodiment, the seventh field in the second signaling consists of 1 bit.

In one embodiment, the second signaling includes an eighth field, and the eighth field in the second signaling indicates whether the first radio signal is correctly received.

In one embodiment, the eighth field in the second signaling is a HARQ-ACK bit map.

In one embodiment, the eighth field in the second signaling consists of 16 bits.

In one embodiment, a given bit in the eighth field in the second signaling corresponds to a given HARQ process number, and the HARQ process number of the first radio signal is the given HARQ process number. The given bit indicates whether the first radio signal is correctly received.

In one subembodiment, if the given bit is equal to 1, the first radio signal is not correctly received; if the given bit is equal to 0, the first radio signal is correctly received.

In one subembodiment, if the given bit is equal to 0, the first radio signal is not correctly received; if the given bit is equal to 1, the first radio signal is correctly received.

In one embodiment, the second signaling includes a ninth field, and the ninth field in the second signaling indicates a TPC.

In one embodiment, the ninth field in the second signaling includes all or partial information in a TPC command for scheduled PUSH field, and specific definitions of the TPC Command for Scheduled PUSH field can refer to Chapter 5.3 in 3GPP TS36.212.

In one embodiment, the ninth field in the second signaling is a TPC command for scheduled PUSH field, and specific definitions of the TPC Command for Scheduled PUSH field can refer to Chapter 5.3 in 3GPP TS36.212.

In one embodiment, the ninth field in the second signaling consists of 2 bits.

In one embodiment, the second signaling includes a tenth field, and the tenth field in the second signaling indicates a TMPI.

In one embodiment, the tenth field in the second signaling includes all or partial information in a Precoding Information and Number of Layers field, and specific definitions of the Precoding Information and Number of Layers field can refer to Chapter 5.3 in 3GPP TS36.212.

In one embodiment, the tenth field in the second signaling is a Precoding Information and Number of Layers field, and specific definitions of the Precoding Information and Number of Layers field can refer to Chapter 5.3 in 3GPP TS36.212.

In one embodiment, the tenth field in the second signaling consists of 3, 4, 5 or 6 bits.

Embodiment 21

Figure 21:
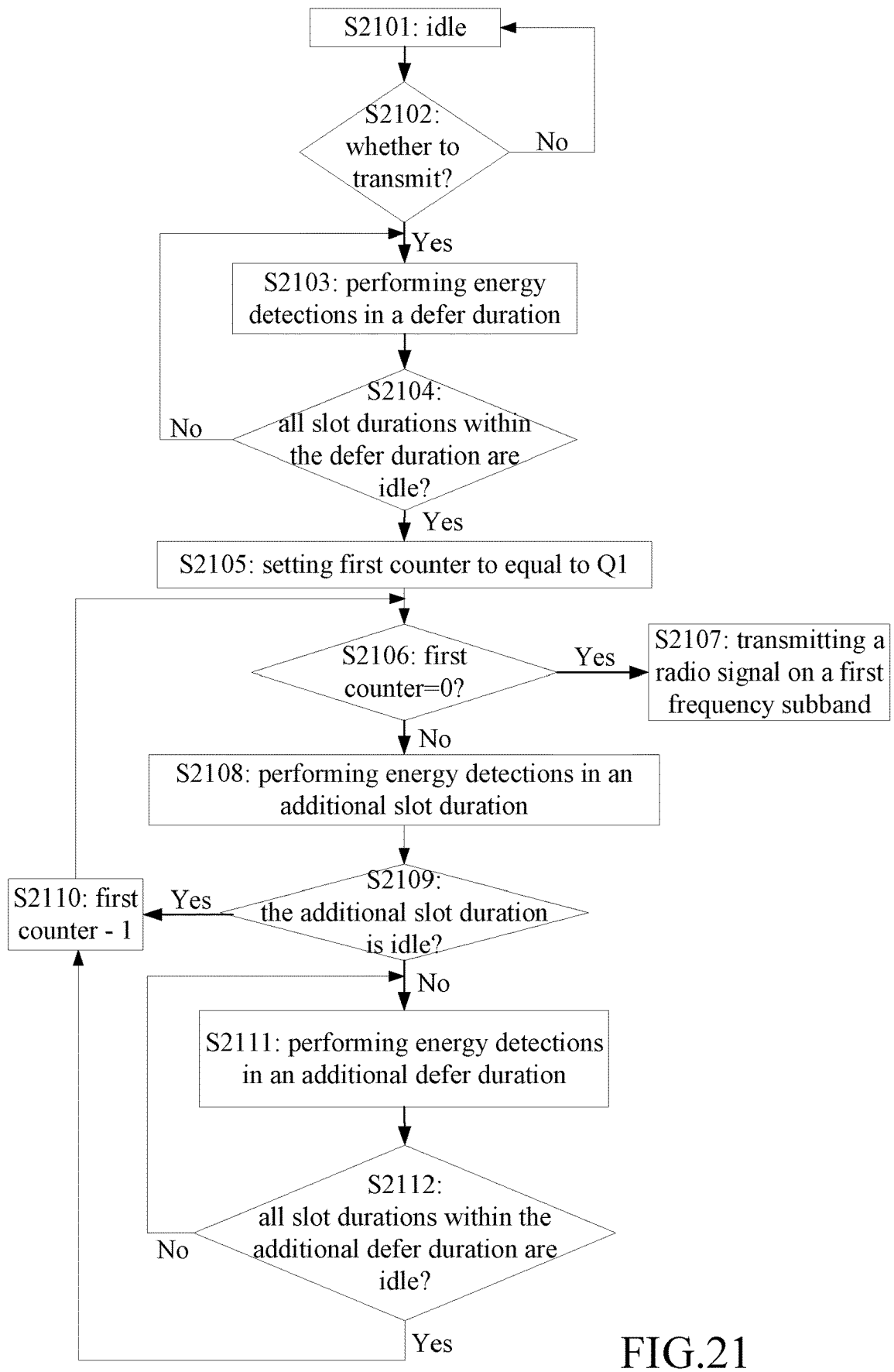
FIG. 21 is a diagram illustrating Q times of energy detections according to one embodiment of the disclosure.

Embodiment 21 illustrates an example of a diagram of Q times of energy detections, as shown in FIG. 21.

In Embodiment 21, the listening in the disclosure includes: performing Q times of energy detections in Q time subpools on the first frequency subband in the disclosure respectively to obtain Q detection values. Herein, the Q time subpools have an end time not later than the first time-position in the disclosure; Q1 detection value(s) among the Q detection values is(are) each less than a first threshold, the Q is a positive integer, and the Q1 is a positive integer not greater than the Q. Q1 time subpool(s) are time subpool(s) among the Q time subpools which is(are) corresponding to the Q1 detection value(s) respectively. The process of the Q times of energy detections can be described through the flowchart shown in FIG. 21.

In FIG. 21, the UE in the disclosure is in an idle state in S2101; determines whether it is needed to transmit signals in S2102; performs energy detections in a defer duration in S2103; determines whether all slot durations within the defer duration are idle in S2104, if yes, goes to S2105 to set a first counter to equal to Q1, otherwise, returns to S2104; determines whether the first counter is 0 in S2106, if yes, goes to S2107 to transmit a radio signal on the first frequency subband, otherwise, goes to S2108 to perform energy detections in an additional slot duration; determines whether the additional slot duration is idle in S2109, if yes, goes to step S2110 to subtract 1 from the first counter, and then returns to S2106, otherwise, goes to S2111 to perform energy detections in an additional defer duration; determines whether all slot durations within the additional defer duration are idle in S2112, if yes, goes to S2110, otherwise, returns to S2111.

In Embodiment 21, a first given duration includes a positive integer number of subpools among the Q time subpools, and the first given duration is any one duration among {all defer durations, all additional slot durations, all additional defer durations} included in FIG. 21. A second given duration includes 1 time subpool among the Q1 time subpool(s), and the second given duration is any one duration among {all additional slot durations, all additional defer durations} determined to be idle through energy detections in FIG. 21.

In one embodiment, specific definitions of the defer duration, the slot duration, the additional slot duration and the additional defer duration can refer to Chapter 15 in 3 GPP TS36.213.

In one embodiment, the end time of the Q time subpools is the first time-position.

In one embodiment, a detection value among the Q detection values which is corresponding to a latest time subpool among the Q time subpools is less than the first threshold.

In one embodiment, any one slot duration in a third given duration includes one of the Q time subpools; and the third given duration is any one duration among {all defer durations, all additional slot durations, all additional defer durations} included in FIG. 21.

In one embodiment, the phrase that performs energy detections in a given duration refers to: performing energy detections in all slot durations within the given duration, wherein the given duration is any one duration among {all defer durations, all additional slot durations, all additional defer durations} included in FIG. 21.

In one embodiment, the phrase that performs energy detections in a given duration refers to: performing energy detections in time subpools corresponding to all slot durations within the given duration, wherein the given duration is any one duration among {all defer durations, all additional slot durations, all additional defer durations} included in FIG. 21; the time subpools corresponding to all slot durations within the given duration belong to the Q time subpools.

In one embodiment, the phrase that a given duration determined to be idle through energy detections refers that: all slot durations included in the given duration are determined to be idle through energy detections, wherein the given duration is any one duration among {all defer durations, all additional slot durations, all additional defer durations} included in FIG. 21.

In one embodiment, the phrase that a given slot duration determined to be idle through energy detections refers that: the UE senses powers or energies of all radio signals on the first frequency subband in a given time unit and averages over time, and the obtained received power or energy is less than the first threshold, wherein the given time unit is a continuous period of time in the given slot duration.

In one subembodiment, the given time unit has a duration not less than 4 microseconds.

In one embodiment, the phrase that a given slot duration determined to be idle through energy detections refers that: the UE performs energy detections in a time subpool included in the given slot duration, and the obtained detection value is less than the first threshold, wherein the time subpool included in the given slot duration belongs to the Q time subpools, and the obtained detection value belongs to the Q detection values.

In one embodiment, one defer duration is 16 microseconds plus S1*9 microseconds, wherein the S1 is a positive integer.

In one subembodiment, one defer duration includes S1+1 time subpools among the Q time subpools.

In one reference embodiment of the above subembodiment, the first time subpool among the S1+1 time subpools has a duration not greater than 16 microseconds, and the other S1 time subpools each have durations not greater than 9 microseconds.

In one subembodiment, the S1 belongs to {1, 2, 3, 7}.

In one embodiment, one defer duration includes a plurality of slot durations.

In one subembodiment, a first slot duration and a second slot duration among the plurality of slot durations are inconsecutive.

In one subembodiment, a first slot duration and a second slot duration among the plurality of slot durations have a time interval of 7 microseconds.

In one embodiment, one additional defer duration is 16 microseconds plus S2*9 microseconds, wherein the S2 is a positive integer.

In one subembodiment, one additional defer duration includes S2+1 time subpools among the Q time subpools.

In one reference embodiment of the above subembodiment, the first time subpool among the S2+1 time subpools has a duration not greater than 16 microseconds, and the other S2 time subpools each have durations not greater than 9 microseconds.

In one subembodiment, the S2 belongs to {1, 2, 3, 7}.

In one embodiment, one defer duration is equal to one additional defer duration.

In one embodiment, the S1 is equal to the S2.

In one embodiment, one additional defer duration includes a plurality of slot durations.

In one subembodiment, a first slot duration and a second slot duration among the plurality of slot durations are inconsecutive.

In one subembodiment, a first slot duration and a second slot duration among the plurality of slot durations have a time interval of 7 microseconds.

In one embodiment, one slot duration is 9 microseconds.

In one embodiment, one slot duration includes 1 time subpool among the Q time subpools.

In one subembodiment, the 1 time subpool has a duration not greater than 9 microseconds.

In one embodiment, one additional slot duration is 9 microseconds.

In one embodiment, one additional slot duration includes 1 time subpool among the Q time subpools.

In one subembodiment, the 1 time subpool has a duration not greater than 9 microseconds.

In one embodiment, the Q1 is one of K candidate integers.

In one embodiment, the K is a $CW_p$ during Category 4 LBT, the $CW_p$ represents Contention Window, and specific definitions of the $CW_p$ can refer to Chapter 15 in 3GPP TS36.213.

In one embodiment, the K candidate integers are 0, 1, 2, ..., K−1.

In one embodiment, the UE selects the value for the Q1 from the K candidate integers randomly.

In one embodiment, the Q times of energy detections refer to energy detections in LBT, and specific definitions and implementations of the LBT can refer to 3GPP TR36.889.

In one embodiment, the Q times of energy detections refer to energy detections in a Clear Channel Assessment (CCA), and specific definitions and implementations of the CCA can refer to 3GPP TR36.889.

In one embodiment, any one of the Q times of energy detections is implemented through the approach defined in Chapter 15 in 3GPP TS36.213.

In one embodiment, any one of the Q time subpools occupies consecutive time domain resources.

In one embodiment, the Q time subpools are orthogonal (non-overlapping) to one another in the time domain.

In one embodiment, any one of the Q time subpools has a duration equal to one of {16 microseconds, 9 microseconds}.

In one embodiment, at least two of the Q time subpools have different durations of time.

In one embodiment, any two of the Q time subpools have the same duration of time.

In one embodiment, time domain resources occupied by the Q time subpools are consecutive.

In one embodiment, at least two adjacent time subpools among the Q time subpools occupy inconsecutive time domain resources.

In one embodiment, any one of the Q time subpools is a slot duration.

In one embodiment, any one of the Q time subpools other than the earliest time subpool is a slot duration.

In one embodiment, the Q time subpools include listening time in Category 4 LBT.

In one embodiment, the Q time subpools include slot durations in defer durations and slot durations in backoff time in Category 4 LBT.

In one embodiment, the Q time subpools include slot durations in defer durations and slot durations in backoff time in a Type 1 UL channel access procedure.

In one embodiment, the Q time subpools include slot durations in an initial CCA and an Enhanced Clear Channel Assessment (eCCA).

In one embodiment, the Q times of energy detections obtain the Q detection values respectively.

In one embodiment, the Q detection values are received powers or energies obtained after the UE senses powers or energies of radio signals on the first frequency subband and average over time in Q time units respectively, wherein the Q time units are continuous periods of time in the Q time subpools respectively.

In one subembodiment, any one of the Q time units has a duration not less than 4 microseconds.

In one embodiment, the Q detection values are in units of dBm.

In one embodiment, the Q detection values are in units of mW.

In one embodiment, the Q detection values are in units of J (Joule).

In one embodiment, the Q1 is less than the Q.

In one embodiment, the Q is greater than 1.

In one embodiment, the first threshold is in units of dBm.

In one embodiment, the first threshold is in units of mW.

In one embodiment, the first threshold is in units of Joule.

In one embodiment, the first threshold is equal to or less than −72 dBm.

In one embodiment, the first threshold is any value equal to or less than a first given value.

In one subembodiment, the first given value is predefined.

In one subembodiment, the first given value is configured by a high-layer signaling.

In one embodiment, the first threshold is selected by the UE freely that is equal to or less than a first given value.

In one embodiment, detection values among the Q detections values that do not belong to the Q1 detection value(s) include at least one detection value that is less than the first threshold value.

In one embodiment, detection values among the Q detections values that do not belong to the Q1 detection value(s) include at least one detection value that is not less than the first threshold value.

In one embodiment, the Q1 time subpool(s) include slot duration(s) in an eCCA only.

In one embodiment, the Q time subpools include the Q1 time subpool(s) and Q2 time subpool(s); any one of the Q2 time subpool(s) does not belong to the Q1 time subpool(s); and the Q2 is a positive integer not greater than the Q minus the Q1.

In one subembodiment, the Q2 time subpool(s) include(s) slot duration(s) in an initial CCA.

In one subembodiment, the Q2 time subpools include all slot durations in all defer durations in FIG. 21.

In one subembodiment, the Q2 time subpools include all slot durations within all additional slot durations and all additional defer durations that are determined to be non-idle through energy detections in FIG. 21.

In one subembodiment, at least one of the Q2 time subpools has a corresponding detection value less than the first threshold.

In one subembodiment, at least one of the Q2 time subpools has a corresponding detection value not less than the first threshold.

In one embodiment, the Q1 time subpool(s) belong to Q1 subpool set(s) respectively, and any one of the Q1 subpool set(s) includes a positive integer number of time subpool(s) among the Q time subpools; any one of the Q1 subpool set(s) has a corresponding detection value less than the first threshold value.

In one subembodiment, at least one of the Q1 subpool set(s) includes 1 time subpool.

In one subembodiment, at least one of the Q1 subpool set(s) includes more than 1 time subpool.

In one subembodiment, at least two of the Q1 subpool sets include different numbers of time subpools.

In one subembodiment, none of the Q time subpools belongs to two of the Q1 subpool sets simultaneously.

In one subembodiment, all time subpools in any one of the Q1 subpool set(s) belong to one same additional defer duration or additional slot duration determined to be idle through energy detections.

In one subembodiment, time subpools among the Q time subpools that do not belong to the Q1 subpool set(s) include at least one time subpool which has a corresponding detection value less than the first threshold.

In one subembodiment, time subpools among the Q time subpools that do not belong to the Q1 subpool set(s) include at least one time subpool which has a corresponding detection value not less than the first threshold.

Embodiment 22

Figure 22:
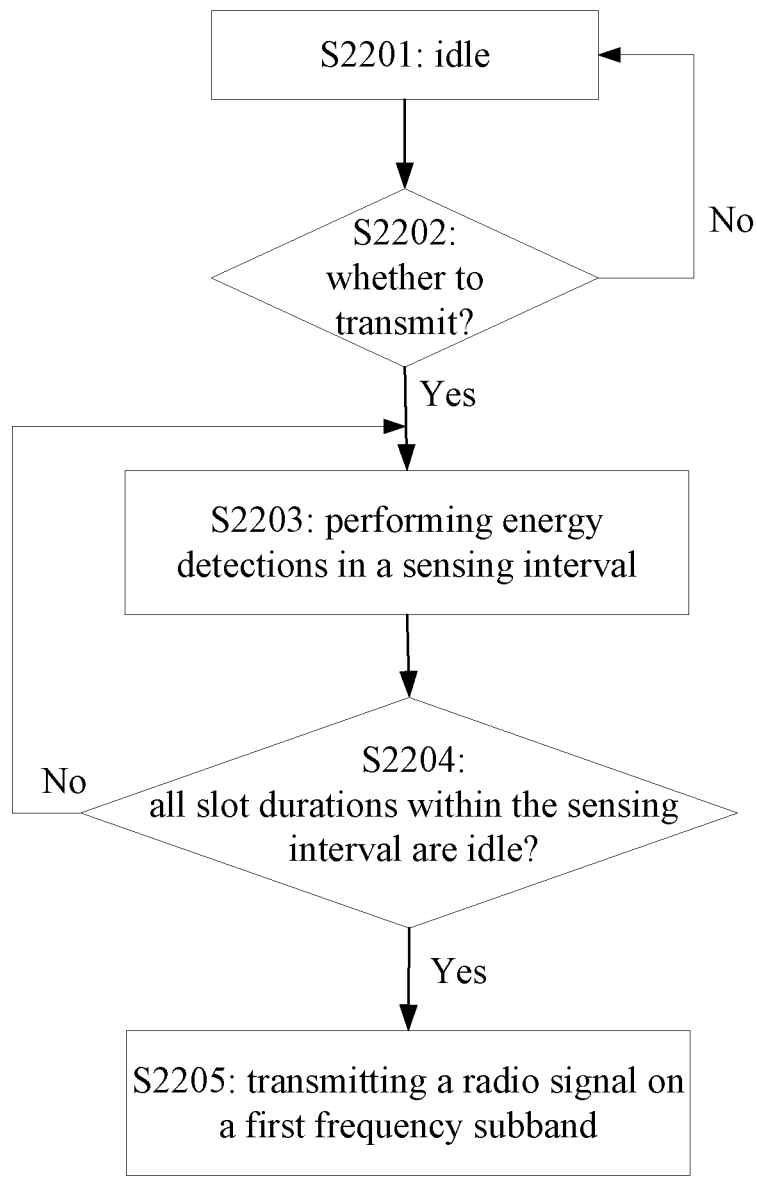
FIG. 22 is a diagram illustrating Q times of energy detections according to one embodiment of the disclosure.

Embodiment 22 illustrates an example of a diagram of Q times of energy detections, as shown in FIG. 22.

In Embodiment 22, the listening in the disclosure includes: performing Q times of energy detections in Q time subpools on the first frequency subband in the disclosure respectively to obtain Q detection values. Herein, the Q time subpools have an end time not later than the first time-position in the disclosure; Q1 detection value(s) among the Q detection values is(are) each less than a first threshold, the Q is a positive integer, and the Q1 is a positive integer not greater than the Q. Q1 time subpool(s) is(are) time subpool(s) among the Q time subpools which is(are) corresponding to the Q1 detection value(s) respectively. The process of the Q times of energy detections can be described through the flowchart shown in FIG. 22.

In Embodiment 22, the UE in the disclosure is in an idle state in S2201; determines whether it is needed to transmit signals in S2202; performs energy detections in a sensing interval in S2203; determines whether all slot durations within the sensing interval are idle in S2204, if yes, goes to S2205 to transmit a radio signal on the first frequency subband, otherwise, returns to S2203.

In Embodiment 22, a first given duration includes a positive integer number of subpool(s) among the Q time subpools, and the first given duration is any one duration among {all sensing intervals} included in FIG. 22. A second given duration includes one of the Q1 time subpool(s), and the second given duration is a sensing interval that is determined to be idle through energy detections in FIG. 22.

In one embodiment, specific definitions of the sensing time can refer to Chapter 15.2 in 3GPP TS36.213.

In one embodiment, the Q1 is equal to 2.

In one embodiment, the Q1 is equal to the Q.

In one embodiment, one sensing interval has a duration of 25 microseconds.

In one embodiment, one sensing interval includes 2 slot durations, and the 2 slot durations are inconsecutive in the time domain.

In one subembodiment, the 2 slot durations have a time interval of 7 microseconds.

In one embodiment, the Q time subpools include listening time in Category 2 LBT.

In one embodiment, the Q time subpools include slots in a sensing interval in a Type 2 UL channel access procedure, and specific definitions of the sensing interval can refer to Chapter 15.2 in 3GPP T S36.213.

In one subembodiment, the sensing interval has a duration of 25 microseconds.

In one embodiment, the Q time subpools include $T_f$ and $T_{sl}$ in a sensing interval in a Type 2 UL channel access procedure, and the specific definitions of the $T_f$ and the $T_{sl}$ can refer to Chapter 15.2 in 3GPP T S36.213.

In one subembodiment, the $T_f$ has a duration of 16 microseconds.

In one subembodiment, the $T_{sl}$ has a duration of 9 microseconds.

In one embodiment, a first time subpool among the Q1 time subpools has a duration of 16 microseconds, a second time subpool among the Q1 time subpools has a duration of 9 microseconds, and the Q1 is equal to 2.

In one embodiment, the Q1 time subpools all have durations of 9 microseconds; a first time subpool and a second time subpool among the Q1 time subpools have a time interval of 7 microseconds, and the Q1 is equal to 2.

Embodiment 23

Figure 23:
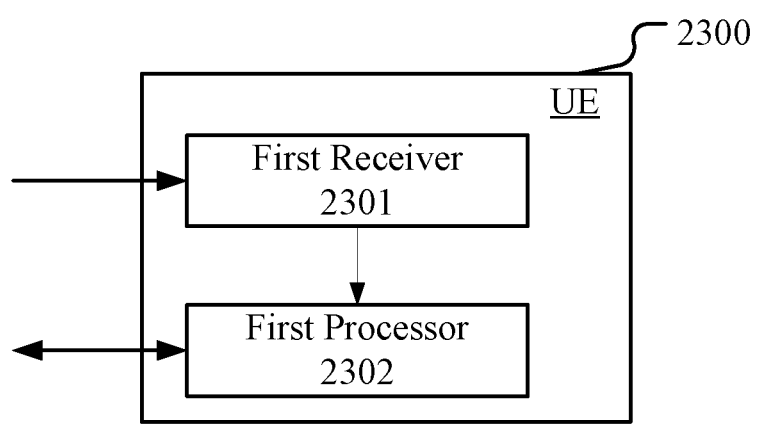
FIG. 23 is a structure block diagram illustrating a processing device in a UE according to one embodiment of the disclosure.

Embodiment 23 illustrates an example of a structure block diagram of a processing device in a UE, as shown in FIG. 23. In FIG. 23, the processing device 2300 in the UE is mainly composed of a first receiver 2301 and a first processor 2302.

In Embodiment 23, the first receiver 2301 receives first information; and the first processor 2301 listens in a first frequency subband, and transmits a first radio signal in the first frequency subband starting from a first time-position.

In Embodiment 23, the first time-position is in a first time window, and the act of listening is used by the first processor 2302 to determine the first time-position; the first time-position is one of L candidate time-position(s) in the first time window; the first information and a time domain position of the first time window are used together by the first processor 2303 to determine at least one of the L and the L candidate time-position(s) in the first time window; and the L is a positive integer.

In one embodiment, the act of listening is used by the first processor 2303 to determine the first time-position from the L candidate time-positions.

In one embodiment, the first radio signal carries first uplink information, and the first uplink information is used for determining the first time-position.

In one embodiment, the first information is used by the first processor 2302 to determine M time windows, and the first time window is one of the M time windows; and the M is a positive integer greater than 1.

In one embodiment, a position of the first time window in the M time windows is used by the first processor 2303 to determine at least one of the L and the L candidate time-position(s) in the first time window.

In one embodiment, the first processor 2303 further selects the first time window from the M time windows autonomously.

In one embodiment, the first receiver 2301 further receives a first signaling, wherein the first signaling indicates frequency resources occupied by the first radio signal.

In one embodiment, the listening includes: performing Q times of energy detections in Q time subpools on the first frequency subband respectively to obtain Q detection values, wherein the Q time subpools have an end time not later than the first time-position, Q1 detection value(s) among the Q detection values is(are) each less than a first threshold, the Q is a positive integer, and the Q1 is a positive integer not greater than the Q.

In one embodiment, the first receiver 2301 further receives a second signaling, wherein the second signaling indicates whether the first radio signal is correctly received.

In one embodiment, the first receiver 2301 includes at least one of {the antenna 452, the receiver 454, the receiving processor 456, the multi-antenna receiving processor 458, the controller/processor 459, the memory 460, the data source 467} mentioned in Embodiment 4.

In one embodiment, the first processor 2303 includes at least one of {the antenna 452, the receiver/transmitter 454, the receiving processor 456, the transmitting processor 468, the multi-antenna receiving processor 458, the multi-antenna transmitting processor 457, the controller/processor 459, the memory 460, the data source 467} mentioned in Embodiment 4.

Embodiment 24

Figure 24:
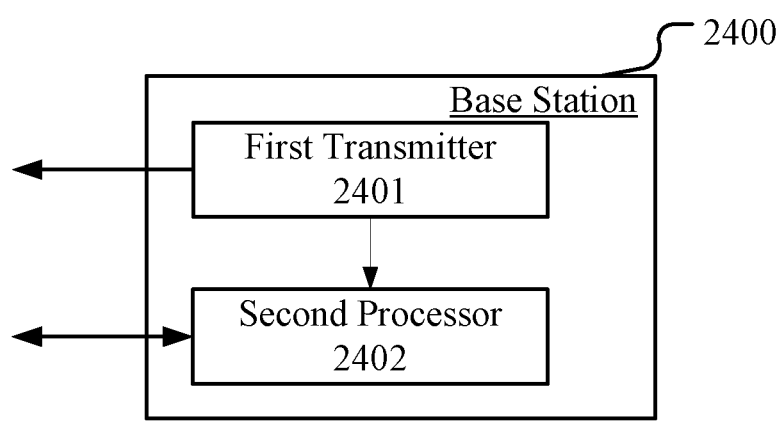
FIG. 24 is a structure block diagram illustrating a processing device in a base station according to one embodiment of the disclosure.

Embodiment 24 illustrates an example of a structure block diagram of a processing device in a base station, as shown in FIG. 24. In FIG. 24, the processing device 2400 in the base station is mainly composed of a first transmitter 2401 and a second processor 2402.

In Embodiment 24, the first transmitter 2402 transmits first information; and the second processor 2402 monitors a first radio signal in a first frequency subband, and receives the first radio signal in the first frequency subband starting from a first time-position.

In Embodiment 24, the first time-position is in a first time window, and the act of monitoring is used by the second processor 2402 to determine the first time window; the first time-position is one of L candidate time-position(s) in the first time window; the first information and a time domain position of the first time window are used together by the second processor 2402 to determine at least one of the L and the L candidate time-position(s) in the first time window; and the L is a positive integer.

In one embodiment, the act of monitoring is used by the second processor 2402 to determine the first time-position from the L candidate time-positions.

In one embodiment, the first radio signal carries first uplink information, and the first uplink information is used by the second processor 2402 to determine the first time-position.

In one embodiment, the first information is used for determining M time windows, and the first time window is one of the M time windows; and the M is a positive integer greater than 1.

In one embodiment, a position of the first time window in the M time windows is used by the second processor 2402 to determine at least one of the L and the L candidate time-position(s) in the first time window.

In one embodiment, the act of monitoring is used by the second processor 2402 to determine the first time window from the M time windows.

In one embodiment, the first transmitter 2401 further transmits a first signaling, wherein the first signaling indicates frequency resources occupied by the first radio signal.

In one embodiment, the first transmitter 2401 further transmits a second signaling, wherein the second signaling indicates whether the first radio signal is correctly received.

In one embodiment, the first transmitter 2401 includes at least one of {the antenna 420, the transmitter 418, the transmitting processor 416, the multi-antenna transmitting processor 471, the controller/processor 475, the memory 476} mentioned in Embodiment 4.

In one embodiment, the second processor 2402 includes at least one of {the antenna 420, the receiver/transmitter 418, the receiving processor 470, the transmitting processor 416, the multi-antenna receiving processor 472, the multi-antenna transmitting processor 471, the controller/processor 475, the memory 475} mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the disclosure includes but not limited to macro-cellular base stations, micro-cellular base stations, home base stations, relay base station, gNB, TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
   receiving first information; and
   listening in a first frequency subband, and transmitting a first radio signal in the first frequency subband starting from a first time-position;

wherein the first time-position is in a first time window; the first time-position is one of L candidate time-position(s) in the first time window; the first time-position is determined from the L candidate time-positions using the act of listening; determining the value of L using the first information and a time domain position of the first time window together; and L is a positive integer; the first information indicates M time windows, and the first time window is one of the M time windows, and the M is a positive integer greater than 1; the M time windows include M3 time windows and M4 time windows, the M3 time windows and the M4 time windows are subsets of the M time windows respectively; and the M3 and the M4 are positive integers less than the M respectively; when the first time window is one of the M3 time windows, the value of L is equal to L1; and when the first time windows is one of the M4 time windows, the value of L is equal to L2; and the L1 and the L2 are unequal positive integers; the first information indicates the M3 time windows, the M4 time windows, the L1 and the L2.

2. The method according to claim 1, wherein the first radio signal carries first uplink information; the first uplink information indicates the first time-position from the L candidate time-positions.

3. The method according to claim 2, wherein time resources occupied by the first radio signal are the first time window, and the first uplink information does not occupy (a) multicarrier symbol(s) before a reference symbol in the first time window, and the reference symbol is a multicarrier symbol where the latest candidate time-position among the L candidate time-position(s) is located.

4. The method according to claim 1, comprising:
selecting the first time window from the M time windows autonomously.

5. The method according to claim 1, comprising:
receiving a first signaling, wherein the first signaling indicates frequency resources occupied by the first radio signal;
or, the listening comprising:
performing Q times of energy detections in Q time subpools on the first frequency subband respectively to obtain Q detection values, wherein the Q time subpools have an end time not later than the first time-position, Q1 detection value(s) among the Q detection values is(are) each less than a first threshold, the Q is a positive integer, and the Q1 is a positive integer not greater than the Q;
or, comprising:
receiving a second signaling, wherein the second signaling indicates whether the first radio signal is correctly received.

6. A method in a base station for wireless communication, comprising:
transmitting first information; and
monitoring a first radio signal in a first frequency subband, and receiving the first radio signal in the first frequency subband starting from a first time-position;
wherein the first time-position is in a first time window; the first time-position is one of L candidate time-position(s) in the first time window, the first time-position is determined from the L candidate time-positions using the act of listening; determining the value of L using the first information and a time domain position of the first time window together; and L is a positive integer; the first information indicates M time windows, and the first time window is one of the M time windows, and the M is a positive integer greater than 1; the M time windows include M3 time windows and M4 time windows, the M3 time windows and the M4 time windows are subsets of the M time windows respectively; and the M3 and the M4 are positive integers less than the M respectively; when the first time window is one of the M3 time windows, the value of L is equal to L1; and when the first time windows is one of the M4 time windows, the value of L is equal to L2; and the L1 and the L2 are unequal positive integers; the first information indicates the M3 time windows, the M4 time windows, the L1 and the L2.

7. The method according to claim 6, wherein the first radio signal carries first uplink information; the first uplink information indicates the first time-position from the L candidate time-positions.

8. The method according to claim 7, wherein time resources occupied by the first radio signal are the first time window, and the first uplink information does not occupy (a) multicarrier symbol(s) before a reference symbol in the first time window, and the reference symbol is a multicarrier symbol where the latest candidate time-position among the L candidate time-position(s) is located.

9. The method according to claim 6, wherein the first time window is determined from the M time windows using the act of monitoring.

10. The method according to claim 6, comprising:
transmitting a first signaling, wherein the first signaling indicates frequency resources occupied by the first radio signal;
or, comprising:
transmitting a second signaling, wherein the second signaling indicates whether the first radio signal is correctly received.

11. The base station according to claim 6, wherein the first time window is determined from the M time windows using the act of monitoring.

12. A UE for wireless communication, comprising:
a first receiver, to receive first information; and
a first processor, to listen in a first frequency subband, and to transmit a first radio signal in the first frequency subband starting from a first time-position;
wherein the first time-position is in a first time window; the first time-position is one of L candidate time-position(s) in the first time window, the first time-position is determined from the L candidate time-positions using the act of listening; determining the value of L using the first information and a time domain position of the first time window together; and L is a positive integer; the first information indicates M time windows, and the first time window is one of the M time windows, and the M is a positive integer greater than 1; the M time windows include M3 time windows and M4 time windows, the M3 time windows and the M4 time windows are subsets of the M time windows respectively; and the M3 and the M4 are positive integers less than the M respectively; when the first time window is one of the M3 time windows, the value of L is equal to L1; and when the first time windows is one of the M4 time windows, the value of L is equal to L2; and the L1 and the L2 are unequal positive integers; the first information indicates the M3 time windows, the M4 time windows, the L1 and the L2.

13. The UE according to claim 12, wherein the first radio signal carries first uplink information; the first uplink information indicates the first time-position from the L candidate time-positions.

14. The UE according to claim 13, wherein time resources occupied by the first radio signal are the first time window, and the first uplink information does not occupy (a) multicarrier symbol(s) before a reference symbol in the first time window, and the reference symbol is a multicarrier symbol where the latest candidate time-position among the L candidate time-position(s) is located.

15. The UE according to claim 12, comprising:
    selecting the first time window from the M time windows autonomously.

16. The UE according to claim 12, wherein the first receiver receives a first signaling, wherein the first signaling indicates frequency resources occupied by the first radio signal;
    or, the listening comprising: performing Q times of energy detections in Q time subpools on the first frequency subband respectively to obtain Q detection values, wherein the Q time subpools have an end time not later than the first time-position, Q1 detection value(s) among the Q detection values is(are) each less than a first threshold, the Q is a positive integer, and the Q1 is a positive integer not greater than the Q;
    or, the first receiver receives a second signaling, wherein the second signaling indicates whether the first radio signal is correctly received.

17. A base station for wireless communication, comprising:
    a first transmitter, to transmit first information; and
    a second processor, to monitor a first radio signal in a first frequency subband, and to receive the first radio signal in the first frequency subband starting from a first time-position;
    wherein the first time-position is in a first time window; the first time-position is one of L candidate time-position(s) in the first time window, the first time-position is determined from the L candidate time-positions using the act of listening; determining the value of L using the first information and a time domain position of the first time window together; and L is a positive integer; the first information indicates M time windows, and the first time window is one of the M time windows, and the M is a positive integer greater than 1; the M time windows include M3 time windows and M4 time windows, the M3 time windows and the M4 time windows are subsets of the M time windows respectively; and the M3 and the M4 are positive integers less than the M respectively; when the first time window is one of the M3 time windows, the value of L is equal to L1; and when the first time windows is one of the M4 time windows, the value of L is equal to L2; and the L1 and the L2 are unequal positive integers; the first information indicates the M3 time windows, the M4 time windows, the L1 and the L2.

18. The base station according to claim 17, wherein the first radio signal carries first uplink information; the first uplink information indicates the first time-position from the L candidate time-positions.

19. The base station according to claim 18, wherein time resources occupied by the first radio signal are the first time window, and the first uplink information does not occupy (a) multicarrier symbol(s) before a reference symbol in the first time window, and the reference symbol is a multicarrier symbol where the latest candidate time-position among the L candidate time-position(s) is located.

20. The base station according to claim 17, wherein the first transmitter transmits a first signaling, wherein the first signaling indicates frequency resources occupied by the first radio signal;
    or, the first transmitter transmits a second signaling, wherein the second signaling indicates whether the first radio signal is correctly received.

\* \* \* \* \*